(12) United States Patent
Komatsu et al.

(10) Patent No.: US 10,858,063 B2
(45) Date of Patent: Dec. 8, 2020

(54) BICYCLE OPERATING DEVICE

(71) Applicant: SHIMANO INC., Sakai (JP)

(72) Inventors: Atsushi Komatsu, Sakai (JP);
Takehiko Nakajima, Sakai (JP);
Takafumi Nishino, Sakai (JP)

(73) Assignee: SHIMANO INC., Sakai (JP)

( * ) Notice: Subject to any disclaimer, the term of this patent is extended or adjusted under 35 U.S.C. 154(b) by 76 days.

(21) Appl. No.: 15/135,486

(22) Filed: Apr. 21, 2016

(65) Prior Publication Data
US 2017/0305491 A1    Oct. 26, 2017

(51) Int. Cl.
*B62K 23/06*    (2006.01)
*B62L 3/02*    (2006.01)

(52) U.S. Cl.
CPC ............. *B62K 23/06* (2013.01); *B62L 3/02* (2013.01); *B62L 3/023* (2013.01)

(58) Field of Classification Search
CPC .......... B62M 25/08; B62L 3/02; B62K 23/06
See application file for complete search history.

(56) References Cited

U.S. PATENT DOCUMENTS

| | | | |
|---|---|---|---|
| 5,470,277 A | 11/1995 | Romano | |
| 6,619,154 B2 | 9/2003 | Campagnolo | |
| 6,698,567 B2 | 3/2004 | Dal | |
| 6,991,081 B2 | 1/2006 | Uno et al. | |
| 7,760,078 B2 | 7/2010 | Miki et al. | |
| 7,874,229 B2 * | 1/2011 | Tetsuka | B62K 23/02 200/61.88 |
| 7,908,940 B2 | 3/2011 | Naka et al. | |
| 8,286,529 B2 | 10/2012 | Tetsuka | |
| 8,539,856 B2 | 9/2013 | Watarai | |
| 8,549,955 B2 | 10/2013 | Sato et al. | |
| 8,655,561 B2 | 2/2014 | Kitamura | |
| 8,909,424 B2 | 12/2014 | Jordan et al. | |

(Continued)

FOREIGN PATENT DOCUMENTS

| | | |
|---|---|---|
| CN | 1327930 | 12/2001 |
| CN | 101445143 | 6/2009 |

(Continued)

OTHER PUBLICATIONS

Office Action with Form PTO-892 Notice of References Cited issued in the United States Patent and Trademark Office for the co-pending U.S. Appl. No. 15/135,488, dated Apr. 17, 2018.

(Continued)

*Primary Examiner* — Thomas C Diaz
(74) *Attorney, Agent, or Firm* — Mori & Ward, LLP

(57) ABSTRACT

A bicycle operating device comprises a base member, a brake operating member, an additional operating member, an electrical switch, and a wireless communication unit. The brake operating member is movably coupled to the base member. The additional operating member is movably coupled to the brake operating member. The electrical switch is to provide an electric signal in response to a movement of the additional operating member. The electrical switch is disposed at the brake operating member. The wireless communication unit is connected to the electrical switch to transmit a wireless signal based on the electric signal. The wireless communication unit is disposed at the additional operating member.

20 Claims, 18 Drawing Sheets

(56) References Cited

U.S. PATENT DOCUMENTS

| | | | |
|---|---|---|---|
| 8,931,365 B2* | 1/2015 | Fujii | B62M 25/08 74/491 |
| 9,045,193 B2 | 6/2015 | Dal | |
| 9,056,651 B2* | 6/2015 | Tetsuka | B62L 3/02 |
| 9,191,038 B2 | 11/2015 | Abe et al. | |
| 9,211,936 B2 | 12/2015 | Gao | |
| 9,321,505 B2 | 4/2016 | Miki | |
| 2005/0099277 A1 | 5/2005 | Hsu | |
| 2008/0180233 A1 | 7/2008 | Miglioranza | |
| 2009/0315692 A1 | 12/2009 | Miki et al. | |
| 2011/0074568 A1 | 3/2011 | Li | |
| 2011/0079453 A1 | 4/2011 | Wanger et al. | |
| 2012/0221205 A1 | 8/2012 | Ichida et al. | |
| 2013/0061705 A1 | 3/2013 | Jordan | |
| 2013/0151073 A1 | 6/2013 | Tetsuka | |
| 2013/0180815 A1 | 7/2013 | Dunlap et al. | |
| 2013/0192407 A1* | 8/2013 | Fujii | B62K 23/06 74/491 |
| 2014/0015659 A1 | 1/2014 | Tetsuka | |
| 2014/0053675 A1 | 2/2014 | Tetsuka | |
| 2014/0144275 A1 | 5/2014 | Kariyama et al. | |
| 2014/0214285 A1* | 7/2014 | Wesling | F16H 59/02 701/51 |
| 2014/0352478 A1 | 12/2014 | Gao | |
| 2015/0203169 A1* | 7/2015 | Nishino | B62K 23/06 74/491 |
| 2015/0259025 A1 | 9/2015 | Sala et al. | |
| 2015/0284049 A1 | 10/2015 | Shipman et al. | |
| 2015/0367176 A1 | 12/2015 | Bejestan et al. | |
| 2017/0305488 A1 | 10/2017 | Komatsu et al. | |
| 2017/0305489 A1 | 10/2017 | Komatsu et al. | |
| 2017/0305491 A1 | 10/2017 | Komatsu et al. | |
| 2018/0057102 A1 | 3/2018 | Komatsu et al. | |
| 2018/0057103 A1 | 3/2018 | Komatsu et al. | |
| 2018/0057104 A1 | 3/2018 | Komatsu et al. | |
| 2018/0057105 A1 | 3/2018 | Komatsu et al. | |

FOREIGN PATENT DOCUMENTS

| | | | | |
|---|---|---|---|---|
| CN | 101607581 | | 12/2009 | |
| CN | 103204219 | | 7/2013 | |
| CN | 103625593 | | 3/2014 | |
| CN | 103847923 | | 6/2014 | |
| CN | 104210612 | | 12/2014 | |
| CN | 104787209 | | 7/2015 | |
| CN | 104973207 | | 10/2015 | |
| DE | 202011005403 | U1 | 8/2011 | |
| EP | 3018048 | | 5/2016 | |
| FR | 2809703 | A1 * | 12/2001 | B62M 25/08 |
| TW | 201339045 | | 10/2013 | |
| TW | 201540600 | | 11/2015 | |

OTHER PUBLICATIONS

Office Action issued by the United States Patent and Trademark Office for the co-pending U.S. Appl. No. 15/135,498, dated Jun. 13, 2018.
Office Action issued by the United States Patent and Trademark Office for the co-pending U.S. Appl. No. 15/135,475, dated Jun. 18, 2018.
Office Action with Form PTO-892 Notice of References Cited issued by the United States Patent and Trademark Office for the co-pending U.S. Appl. No. 15/135,469, dated Feb. 23, 2018.
Office Action with Form PTO-892 Notice of References Cited issued by the United States Patent and Trademark Office for the co-pending U.S. Appl. No. 15/135,475, dated Feb. 23, 2018.
Office Action with Form PTO-892 Notice of References Cited issued by the United States Patent and Trademark Office for the co-pending U.S. Appl. No. 15/135,492, dated Apr. 4, 2018.
Office Action with Form PTO-892 Notice of References Cited issued by the United States Patent and Trademark Office for the co-pending U.S. Appl. No. 15/135,498, dated Nov. 20, 2017.
Office Action issued by the United States Patent and Trademark Office for the co-pending U.S. Appl. No. 15/135,498, dated Oct. 31, 2017.
Office Action issued by the United States Patent and Trademark Office for the co-pending U.S. Appl. No. 15/135,498, dated Aug. 17, 2017.
Office Action with Form PTO-892 Notice of References Cited issued by the United States Patent and Trademark Office for the co-pending U.S. Appl. No. 15/135,498, dated Apr. 24, 2017.
Office Action issued by the United States Patent and Trademark Office for the co-pending U.S. Appl. No. 15/135,498, dated Nov. 16, 2018.
Office Action with Form PTO-892 Notice of References Cited issued by the United States Patent and Trademark Office for the co-pending U.S. Appl. No. 15/135,492, dated Aug. 15, 2018.
Office Action issued by the United States Patent and Trademark Office for the co-pending U.S. Appl. No. 15/135,488, dated Sep. 12, 2018.
Office Action issued by the United States Patent and Trademark Office for the co-pending U.S. Appl. No. 15/135,492, dated Nov. 27, 2018.
Office Action with Form PTO-892 Notice of References Cited issued by the United States Patent and Trademark Office for the co-pending U.S. Appl. No. 15/135,475, dated Jan. 8, 2019.
Office Action with Form PTO-892 Notice of References Cited issued by the United States Patent and Trademark Office for the co-pending U.S. Appl. No. 15/135,498, dated Dec. 10, 2018.
Office Action issued by the United States Patent and Trademark Office for the co-pending U.S. Appl. No. 15/135,498, dated Apr. 2, 2019.
Office Action issued by the United States Patent and Trademark Office for the co-pending U.S. Appl. No. 15/135,481, dated Apr. 8, 2019.
Define may be—Google search, google.com., Apr. 1, 2019.
Define front side—Google search, google.com., Apr. 1, 2019.
Office Action with Form PTO-892 Notice of References Cited issued by the United States Patent and Trademark Office for the co-pending U.S. Appl. No. 15/135,481, dated Sep. 28, 2018.
Office Action issued by the United States Patent and Trademark Office for the co-pending U.S. Appl. No. 15/135,488, dated Mar. 5, 2019.
Office Action issued by the United States Patent and Trademark Office for the co-pending U.S. Appl. No. 15/135,492, Feb. 21, 2019.
Office Action issued by the United States Patent and Trademark Office for the co-pending U.S. Appl. No. 15/135,488, dated Dec. 19, 2018.

* cited by examiner

| EMBODIMENTS MODIFICATIONS | 54 | | | 56 | | |
|---|---|---|---|---|---|---|
| | 54X | 54Y | 54Z | 56X | 56Y | 56Z |
| 1ST, 3RD, 4TH | O | - | - | O | - | - |
| M1-1 | O | - | - | - | O | - |
| 2ND | O | - | - | - | - | O |
| M1-2 | O | - | - | O | O | - |
| M1-3 | O | - | - | O | - | O |
| M1-4 | O | - | - | - | O | O |
| M1-5 | O | - | - | O | O | O |
| M1-6 | - | O | - | O | - | - |
| M1-7 | - | O | - | - | O | - |
| M1-8 | - | O | - | - | - | O |
| M1-9 | - | O | - | O | O | - |
| M1-10 | - | O | - | O | - | O |
| M1-11 | - | O | - | - | O | O |
| M1-12 | - | O | - | O | O | O |
| M1-13 | - | - | O | O | - | - |
| M1-14 | - | - | O | - | O | - |
| M1-15 | - | - | O | - | - | O |
| M1-16 | - | - | O | O | O | - |
| M1-17 | - | - | O | O | - | O |
| M1-18 | - | - | O | - | O | O |
| M1-19 | - | - | O | O | O | O |
| M1-20 | O | O | - | O | - | - |
| M1-21 | O | O | - | - | O | - |
| M1-22 | O | O | - | - | - | O |
| M1-23 | O | O | - | O | O | - |
| M1-24 | O | O | - | O | - | O |
| M1-25 | O | O | - | - | O | O |
| M1-26 | O | O | - | O | O | O |

FIG. 17

| EMBODIMENTS | 54 | | | 56 | | |
|---|---|---|---|---|---|---|
| MODIFICATIONS | 54X | 54Y | 54Z | 56X | 56Y | 56Z |
| M1-27 | O | - | O | O | - | - |
| M1-28 | O | - | O | - | O | - |
| M1-29 | O | - | O | - | - | O |
| M1-30 | O | - | O | O | O | - |
| M1-31 | O | - | O | O | - | O |
| M1-32 | O | - | O | - | O | O |
| M1-33 | O | - | O | O | O | O |
| M1-34 | - | O | O | O | - | - |
| M1-35 | - | O | O | - | O | - |
| M1-36 | - | O | O | - | - | O |
| M1-37 | - | O | O | O | O | - |
| M1-38 | - | O | O | O | - | O |
| M1-39 | - | O | O | - | O | O |
| M1-40 | - | O | O | O | O | O |
| M1-41 | O | O | O | O | - | - |
| M1-42 | O | O | O | - | O | - |
| M1-43 | O | O | O | - | - | O |
| M1-44 | O | O | O | O | O | - |
| M1-45 | O | O | O | O | - | O |
| M1-46 | O | O | O | - | O | O |
| M1-47 | O | O | O | O | O | O |

FIG. 18

BICYCLE OPERATING DEVICE

BACKGROUND OF THE INVENTION

Field of the Invention

The present invention relates to a bicycle operating device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is an operating device.

SUMMARY OF THE INVENTION

In accordance with a first aspect of the present invention, a bicycle operating device comprises a base member, a brake operating member, an additional operating member, an electrical switch, and a wireless communication unit. The brake operating member is movably coupled to the base member. The additional operating member is movably coupled to the brake operating member. The electrical switch is to provide an electric signal in response to a movement of the additional operating member. The electrical switch is disposed at the brake operating member. The wireless communication unit is connected to the electrical switch to transmit a wireless signal based on the electric signal. The wireless communication unit is disposed at the additional operating member.

With the bicycle operating device according to the first aspect, it is possible to improve a design freedom of the bicycle operating device compared with a case where the electrical switch and the wireless communication unit is disposed at one of the brake operating member and the additional operating member.

In accordance with a second aspect of the present invention, the bicycle operating device according to the first aspect is configured so that the additional operating member includes an actuation part disposed to face the electrical switch to press the electrical switch in response to the movement of the additional operating member.

With the bicycle operating device according to the second aspect, it is possible to easily press the electrical switch using the movement of the additional operating member.

In accordance with a third aspect of the present invention, the bicycle operating device according to the second aspect is configured so that the actuation part includes a projection to face the electrical switch.

With the bicycle operating device according to the third aspect, it is possible to transmit the movement of the additional operating member to the electrical switch using the projection.

In accordance with a fourth aspect of the present invention, the bicycle operating device according to any one of the first to third aspects further comprises a cable operating structure coupled to the brake operating member to move a mechanical control cable in response to a movement of the brake operating member relative to the base member.

With the bicycle operating device according to the fourth aspect, it is possible to respectively operate the bicycle brake and the electrical bicycle component using the brake operating member and the additional operating member via the mechanical control cable and a wireless communication.

In accordance with a fifth aspect of the present invention, the bicycle operating device according to any one of the first to fourth aspects further comprises a hydraulic unit coupled to the brake operating member to generate a hydraulic pressure in response to a movement of the brake operating member relative to the base member.

With the bicycle operating device according to the fifth aspect, it is possible to respectively operate the bicycle brake and the electrical bicycle component using the brake operating member and the additional operating member via a hydraulic fluid and a wireless communication.

In accordance with a sixth aspect of the present invention, the bicycle operating device according to any one of the first to fifth aspects further comprises an informing unit disposed on at least one of the base member, the brake operating member, and the additional operating member.

With the bicycle operating device according to the sixth aspect, it is possible to inform a user of information relating to the bicycle operating device.

In accordance with a seventh aspect of the present invention, the bicycle operating device according to the sixth aspect is configured so that the informing unit is connected to the wireless communication unit to inform a user of a status of the wireless communication unit.

With the bicycle operating device according to the seventh aspect, it is possible to check the status of the wireless communication unit.

In accordance with an eighth aspect of the present invention, the bicycle operating device according to the first to seventh aspects is configured so that the base member includes a first end portion and a second end portion. The first end portion is configured to be coupled to a handlebar in a mounting state where the bicycle operating device is mounted to the handlebar. The second end portion is opposite to the first end portion. The brake operating member is movably coupled to the second end portion.

With the bicycle operating device according to the eighth aspect, it is possible to provide a distance between the handlebar and the brake operating member. Accordingly, it is possible to easily operate the brake operating member.

In accordance with a ninth aspect of the present invention, the bicycle operating device according to the eighth aspect is configured so that the first end portion includes a mounting surface having a curved shape corresponding to a drop-down handlebar.

With the bicycle operating device according to the ninth aspect, it is possible to firmly fix the bicycle operating device to the drop-down handlebar.

In accordance with a tenth aspect of the present invention, the bicycle operating device according to the eighth or ninth aspect is configured so that the base member includes a grip portion arranged between the first end portion and the second end portion.

With the bicycle operating device according to the tenth aspect, the grip portion allows the user to easily operate at least one of the brake operating member and the additional operating member.

In accordance with an eleventh aspect of the present invention, the bicycle operating device according to any one of the eighth to tenth aspects is configured so that the second end portion includes a pommel portion.

With the bicycle operating device according to the eleventh aspect, the pommel portion allows the user to lean on the base member during riding a bicycle.

In accordance with a twelfth aspect of the present invention, the bicycle operating device according to any one of the eighth to eleventh aspects is configured so that the first end portion is configured to be coupled to a bar end of the handlebar in the mounting state.

With the bicycle operating device according to the twelfth aspect, it is possible to utilize the bicycle operating device as a bar-end operating device.

In accordance with a thirteenth aspect of the present invention, the bicycle operating device according to any one of the eighth to twelfth aspects is configured so that the brake operating member is pivotable relative to the base member between a first rest position and a first operated position. The additional operating member is at least partially closer to the first end portion than the brake operating member in a rest state where the brake operating member is at the first rest position.

With the bicycle operating device according to the thirteenth aspect, it is possible to improve the operability of the additional operating member compared with a case where the additional operating member is farther from the first end portion than the brake operating member.

In accordance with a fourteenth aspect of the present invention, the bicycle operating device according to any one of the first to thirteenth aspects is configured so that the brake operating member is pivotally coupled to the base member in a first direction. The additional operating member is pivotally coupled to the brake operating member in a second direction. The second direction is different from the first direction. The electrical switch is configured to provide an electric signal in response to a movement of the additional operating member in the second direction.

With the bicycle operating device according to the fourteenth aspect, it is possible to differentiate the movement of the additional operating member from the movement of the brake operating member. This allows the user to easily recognize each of the movement of the brake operating member and the movement of the additional operating member with simplifying the structure of the bicycle operating device.

In accordance with a fifteenth aspect of the present invention, the bicycle operating device according to the fourteenth aspect is configured so that the brake operating member is pivotable relative to the base member about a first pivot axis in the first direction. The additional operating member is pivotable relative to the brake operating member about a second pivot axis in the second direction. The second pivot axis is non-parallel to the first pivot axis.

With the bicycle operating device according to the fifteenth aspect, it is possible to effectively differentiate the movement of the additional operating member from the movement of the brake operating member. This allows the user to easily recognize each of the movement of the brake operating member and the movement of the additional operating member with simplifying the structure of the bicycle operating device.

In accordance with a sixteenth aspect of the present invention, the bicycle operating device according to the fourteenth or fifteenth aspects is configured so that the brake operating member is pivotable relative to the base member about a first pivot axis in the first direction. The additional operating member is pivotable relative to the brake operating member about a second pivot axis in the second direction. The second pivot axis is disposed above the first pivot axis in a mounting state where the bicycle operating device is mounted to a handlebar.

With the bicycle operating device according to the sixteenth aspect, it is possible to make a radius of the pivotal movement of the additional operating member longer than a case where the second pivot axis is disposed below the first pivot axis in the mounting state, for example. This can reduce a change in an orientation of the additional operating member relative to the brake operating member when the additional operating member is pivoted relative to the brake operating member about the second pivot axis. Thus, it is possible to stabilize the movement of the additional operating member relative to the brake operating member.

In accordance with a seventeenth aspect of the present invention, the bicycle operating device according to any one of the first to sixteenth aspects further comprises a power supply connected to at least one of the electrical switch and the wireless communication unit.

With the bicycle operating device according to the seventeenth aspect, it is possible to supply electric power to the at least one of the electrical switch and the wireless communication unit.

In accordance with an eighteenth aspect of the present invention, the bicycle operating device according to the seventeenth aspect is configured so that the power supply is disposed on at least one of the base member, the brake operating member, and the additional operating member.

With the bicycle operating device according to the eighteenth aspect, it is possible to handle the bicycle operating device including the power supply as a single unit.

In accordance with a nineteenth aspect of the present invention, the bicycle operating device according to the eighteenth aspect is configured so that the power supply is disposed at the base member.

With the bicycle operating device according to the nineteenth aspect, it is possible to handle the bicycle operating device including the power supply as a single unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 17 and 18 show combinations of the arrangements illustrated in FIG. 16.

DESCRIPTION OF THE EMBODIMENTS

Figure 1:
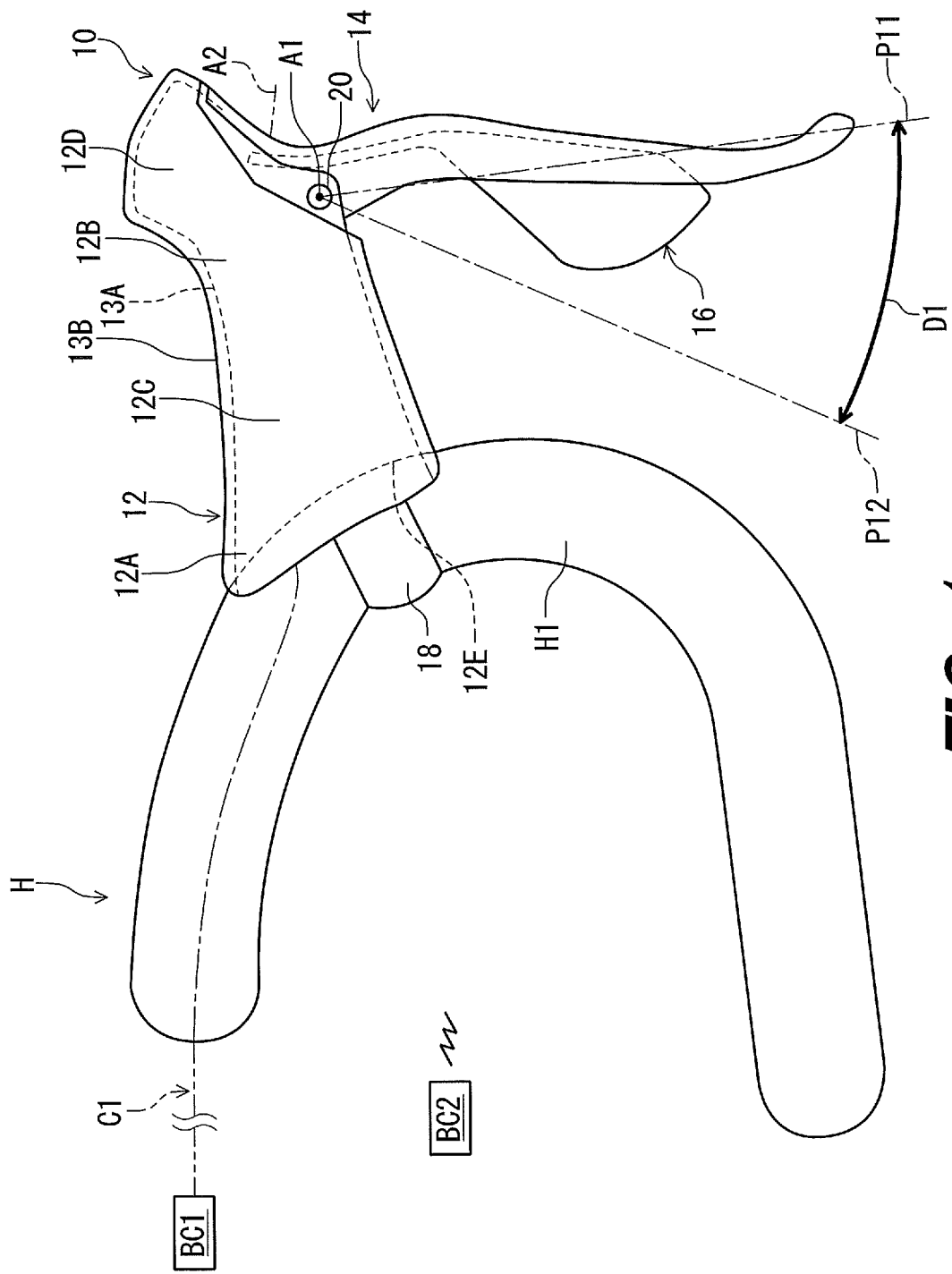
FIG. 1 is a right side elevational view of a bicycle operating device in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle operating device 10 in accordance with a first embodiment is configured to be mounted to a handlebar H. In this embodiment, the bicycle operating device 10 is configured to be mounted to a drop-down handlebar. However, structures of the bicycle operating device 10 can be applied to other operating devices mounted to other type of handlebars such as a flat handlebar, a time trial handlebar, and a bull horn handlebar. The handlebar H can also be referred to as the drop-down handlebar H.

The bicycle operating device 10 is operatively coupled to a bicycle brake BC1. In this embodiment, the bicycle operating device 10 is operatively coupled to the bicycle brake BC1 via a control element C1. While the control element C1 is a mechanical control cable in this embodiment, the control element C1 can be other elements such as a hydraulic hose and an electric control cable. The control element C1 can also be referred to as the mechanical control cable C1.

Furthermore, the bicycle operating device 10 is operatively connected to the electrical bicycle component BC2 via wireless communication. Examples of the electrical bicycle component BC2 include an electric shifting device, an electric suspension, and an electric seatpost. In this embodiment, the bicycle operating device 10 is operatively connected to an electric shifting device as the electrical bicycle component BC2 via wireless communication. The electrical bicycle component BC2 can also be referred to as the electric shifting device BC2. Examples of the electric shifting device BC2 include a derailleur and an internal-gear hub.

In this embodiment, the bicycle operating device 10 is a right hand side control device configured to be operated by the rider's right hand to actuate the bicycle brake BC1 and the electrical bicycle component BC2. However, the structures of the bicycle operating device 10 can be applied to a left hand side control device.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing the handlebar H. Accordingly, these terms, as utilized to describe the bicycle operating device 10, should be interpreted relative to the bicycle equipped with the bicycle operating device 10 as used in an upright riding position on a horizontal surface.

Figure 2:
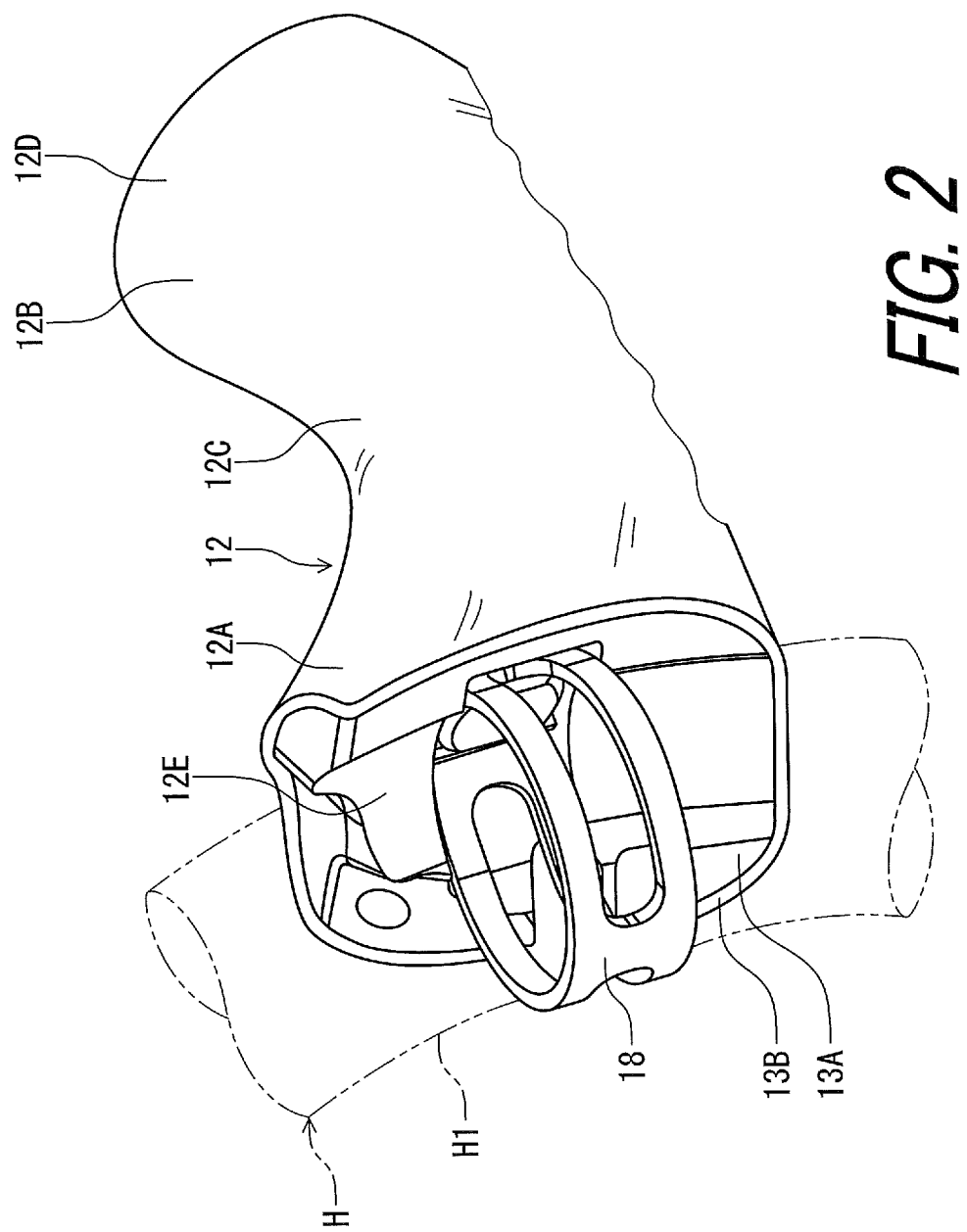
FIG. 2 is a partial perspective view of the bicycle operating device illustrated in FIG. 1.

As seen in FIG. 1, the bicycle operating device 10 comprises a base member 12, a brake operating member 14, and an additional operating member 16. The base member 12 includes a first end portion 12A and a second end portion 12B. The first end portion 12A is configured to be coupled to the handlebar H in a mounting state where the bicycle operating device 10 is mounted to the handlebar H. The drop-down handlebar H includes a curved part H1. The first end portion 12A is configured to be coupled to the curved part H1 in the mounting state where the bicycle operating device 10 is mounted to the handlebar H. The bicycle operating device 10 comprises a mounting clamp 18 to couple the base member 12 to the handlebar H. As seen in FIG. 2, the first end portion 12A includes a mounting surface 12E having a curved shape corresponding to the drop-down handlebar H. Specifically, the mounting surface 12E has the curved shape corresponding to an outer peripheral surface of the curved part H1.

As seen in FIGS. 1 and 2, the second end portion 12B is opposite to the first end portion 12A. The base member 12 includes a grip portion 12C arranged between the first end portion 12A and the second end portion 12B. The second end portion 12B includes a pommel portion 12D. The pommel portion 12D extends obliquely upward from the grip portion 12C. The pommel portion 12D is disposed at a position higher than a position of the first end portion 12A in the mounting state of the bicycle operating device 10. The pommel portion 12D can also be configured to be graspable if needed and/or desired.

In this embodiment, the base member 12 includes a base body 13A and a grip cover 13B. The grip cover 13B at least partly covers the base body 13A. The first end portion 12A, the second end portion 12B, the grip portion 12C, and the pommel portion 12D are constituted by at least one of the base body 13A and the grip cover 13B. The grip cover 13B can be omitted from the base member 12.

As seen in FIG. 1, the brake operating member 14 is movably coupled to the base member 12. The brake operating member 14 is movably coupled to the second end portion 12B. The brake operating member 14 is pivotally coupled to the base member 12 in a first direction D1. Specifically, the brake operating member 14 is pivotable relative to the base member 12 about a first pivot axis A1 in the first direction D1. The brake operating member 14 is pivotable relative to the base member 12 between a first rest position P11 and a first operated position P12. In other words, the brake operating member 14 is provided as a brake operating lever pivotable about the first pivot axis A1. In this embodiment, the first direction D1 is a circumferential direction defined about the first pivot axis A1.

In the present application, the term "rest position" as used herein refers to a position at which a movable part such as the brake operating member 14 and the additional operating member 16 remains stationary in a state where the movable part is not operated by the user. The term "operated position" as used herein refers to a position at which the movable part has been operated by the user to perform the operation of the bicycle component.

As seen in FIG. 1, the brake operating member 14 is pivotally coupled to the base member 12 via a first pivot pin 20. The first pivot pin 20 defines the first pivot axis A1. The brake operating member 14 is biased by a first biasing member 21 (FIG. 5) toward the first rest position P11 relative to the base member 12. Thus, the brake operating member 14 is at the first rest position P11 in a state where the brake operating member 14 is not operated by the user. The additional operating member 16 is at least partially closer to the first end portion 12A than the brake operating member 14 in a rest state where the brake operating member 14 is at the first rest position P11. However, the additional operating member 16 can be farther from the first end portion 12A than the brake operating member 14 in the rest state where the brake operating member 14 is at the first rest position P11.

Figure 3:
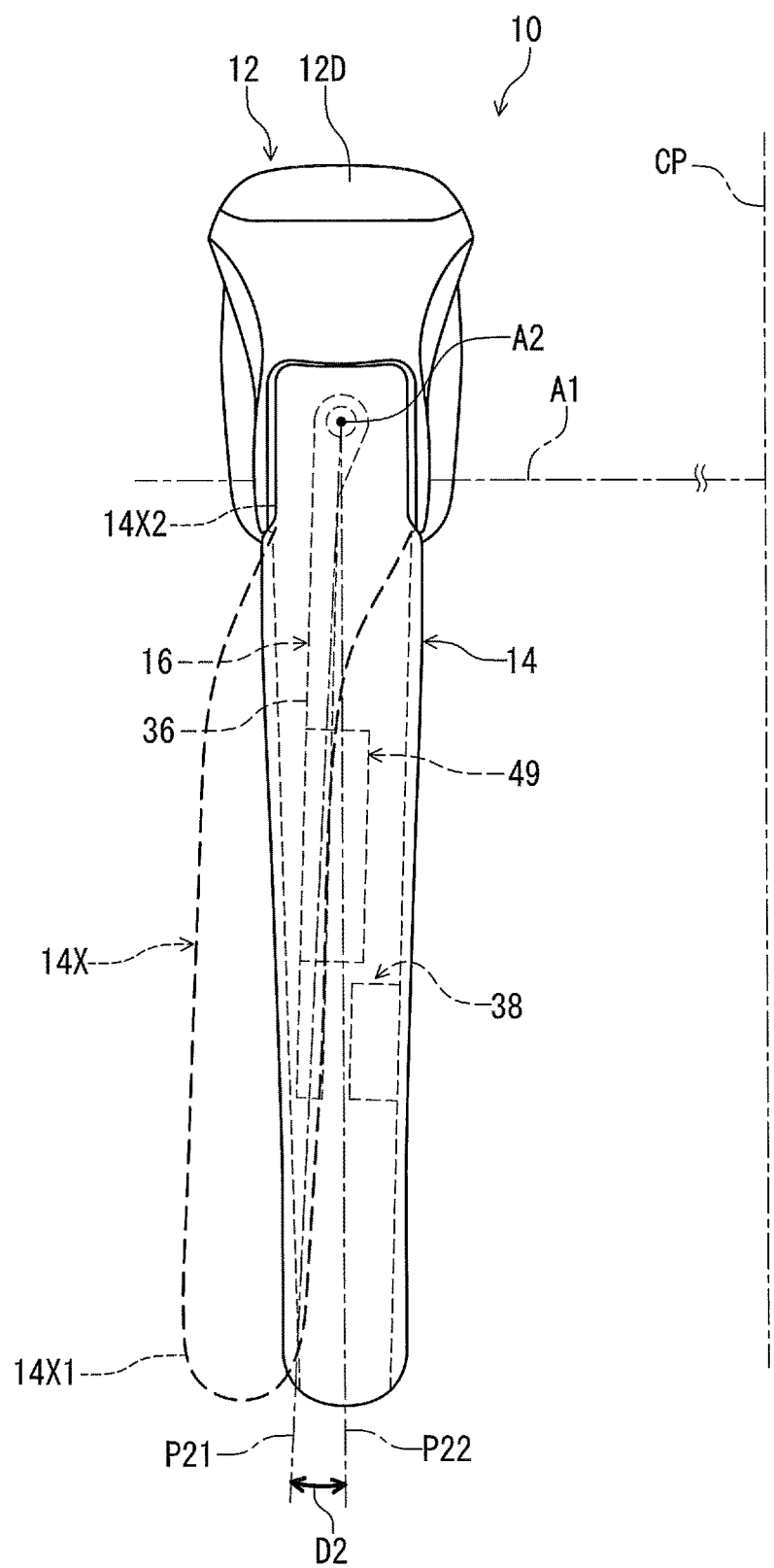
FIG. 3 is a front view of the bicycle operating device illustrated in FIG. 1.

As seen in FIG. 3, the additional operating member 16 is movably coupled to the brake operating member 14. The additional operating member 16 is pivotally coupled to the brake operating member 14 in a second direction D2. Specifically, the additional operating member 16 is pivotable relative to the brake operating member 14 about a second pivot axis A2 in the second direction D2. While the second direction D2 is different from the first direction D1 in this embodiment, the second direction D2 can be equal to the first direction D1. The additional operating member 16 is pivotally coupled to the base member 12 via the brake operating member 14. Thus, the additional operating member 16 is pivotable relative to the base member 12 about the first pivot axis A1 together with the brake operating member 14.

The additional operating member 16 is pivotable relative to the brake operating member 14 about the second pivot axis A2 between a second rest position P21 and a second operated position P22. In this embodiment, the second direction D2 is a circumferential direction defined about the second pivot axis A2. The additional operating member 16 is biased by a second biasing member 44 (FIG. 4) toward the second rest position P21 relative to the brake operating member 14. The additional operating member 16 is at the second rest position P21 in a state where the additional operating member 16 is in contact with the brake operating member 14. Thus, the additional operating member 16 is at the second rest position P21 in a state where the additional operating member 16 is not operated by the user.

The second pivot axis A2 is disposed above the first pivot axis A1 in the mounting state where the bicycle operating device 10 is mounted to the handlebar H. However, the second pivot axis A2 can be disposed below the first pivot axis A1 in the mounting state of the bicycle operating device 10. The second pivot axis A2 can be disposed at the same height as a height of the first pivot axis A1 in the mounting state of the bicycle operating device 10.

While the additional operating member 16 is used as a shift operating member in this embodiment, the additional operating member 16 can be used as an operating member other than the shift operating member. For example, the additional operating member 16 can be used as a suspension operating member in a case where the electrical bicycle component includes the electric suspension. The additional operating member 16 can be used as a seatpost operating member in a case where the electrical bicycle component includes the electric seatpost.

As indicated with a broken line 14X in FIG. 3, the brake operating member 14 can have a curved shape such that a distal end portion 14X1 of the brake operating member 14 is offset from a proximal end portion 14X2 of the brake operating member 14. In FIG. 3, the distal end portion 14X1 is offset from the proximal end portion 14X2 toward an opposite side of a bicycle transverse center plane CP of a bicycle. In such an embodiment, the third rest position P31 of the additional operating member 16 is adjusted toward the opposite side of the bicycle transverse center plane CP.

Figure 4:
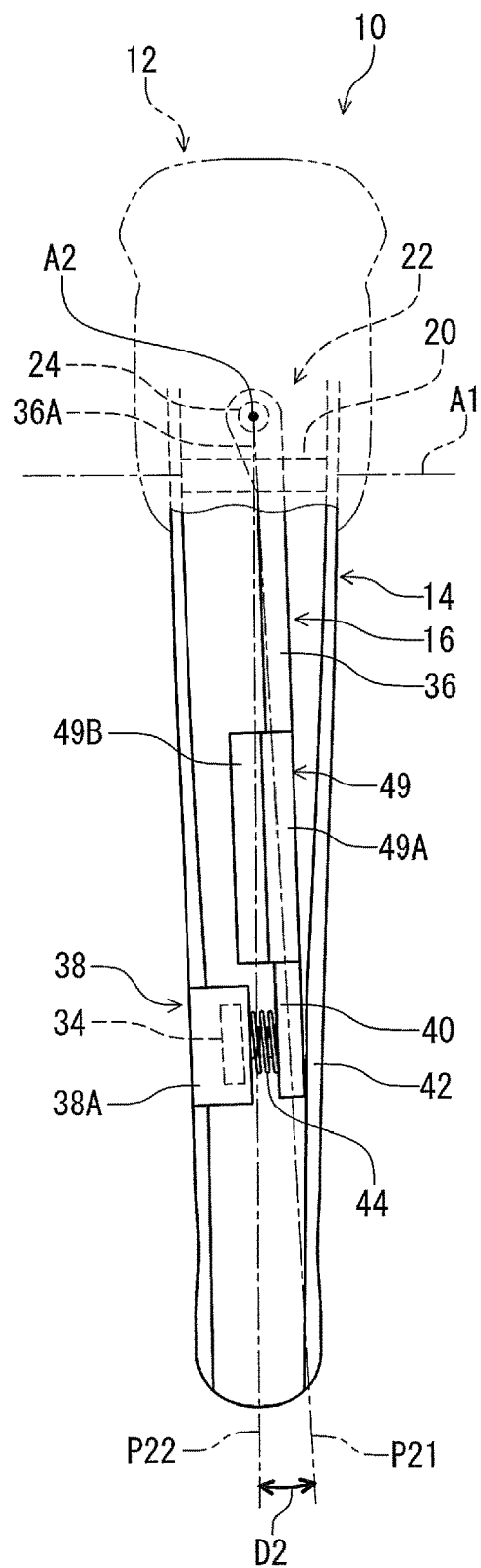
FIG. 4 is a partial rear view of the bicycle operating device illustrated in FIG. 1.
Figure 5:
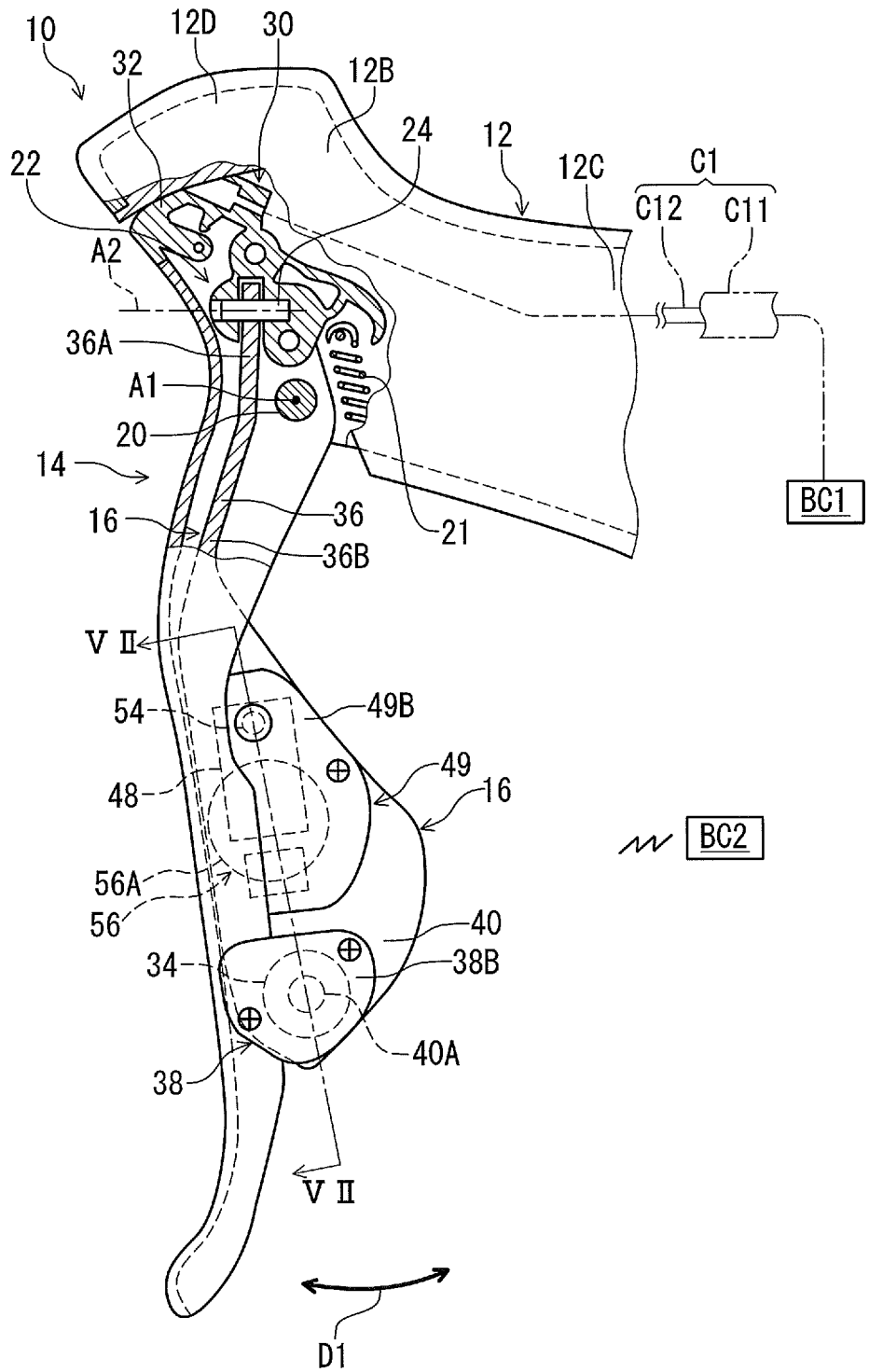
FIG. 5 is a partial right side elevational view of the bicycle operating device illustrated in FIG. 1.

As seen in FIGS. 4 and 5, the bicycle operating device 10 comprises a coupling structure 22 pivotally coupling the additional operating member 16 to the brake operating member 14. Specifically, the coupling structure 22 includes a second pivot pin 24. The second pivot pin 24 is attached to the brake operating member 14 and defines the second pivot axis A2. The additional operating member 16 is pivotally coupled to the brake operating member 14 about the second pivot axis A2 via the second pivot pin 24.

Figure 6:
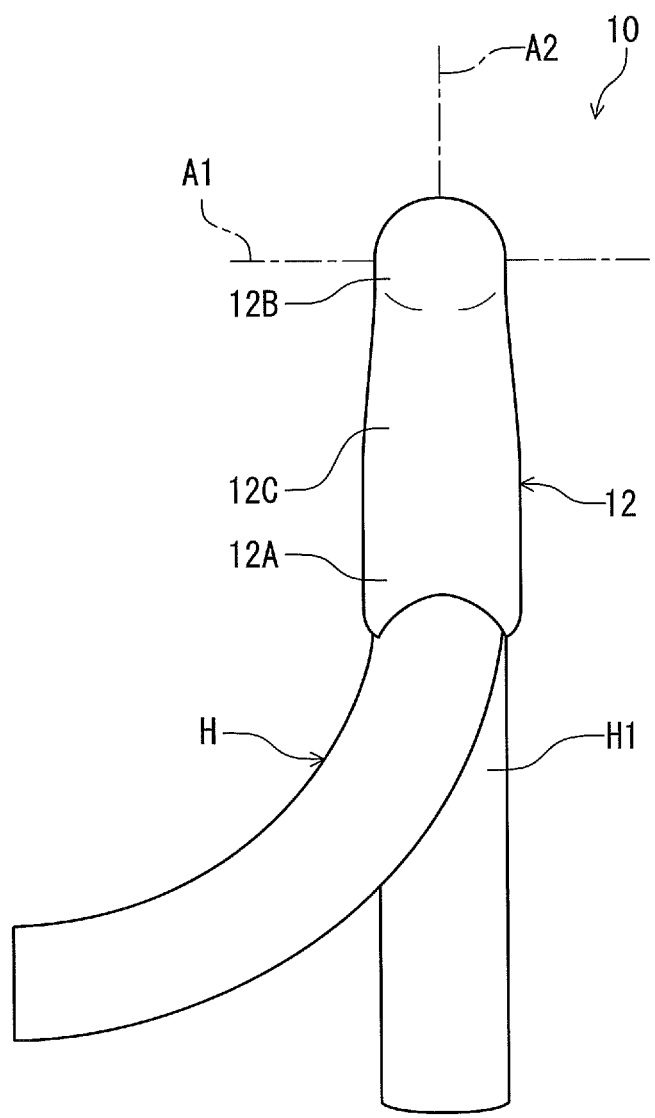
FIG. 6 is a top view of the bicycle operating device illustrated in FIG. 1.

As seen in FIG. 6, the second pivot axis A2 is non-parallel to the first pivot axis A1. Specifically, the second pivot axis A2 is non-parallel to the first pivot axis A1 when viewed from above the bicycle operating device 10 in the mounting state where the bicycle operating device 10 is mounted to the handlebar H. The second pivot axis A2 is orthogonal to the first pivot axis A1 when viewed from above the bicycle operating device 10 in the mounting state of the bicycle operating device 10. However, the second pivot axis A2 can be inclined relative to the first pivot axis A1 when viewed from above the bicycle operating device 10 in the mounting state of the bicycle operating device 10.

As seen in FIG. 5, the bicycle operating device 10 further comprises a cable operating structure 30 coupled to the brake operating member 14 to move the mechanical control cable C1 in response to a movement of the brake operating member 14 in the first direction D1. The mechanical control cable C1 includes an outer casing C11 and an inner wire C12 movably provided in the outer casing C11. In this embodiment, the cable operating structure 30 is provided at an end of the brake operating member 14 to receive an end of the inner wire C12 of the mechanical control cable C1.

The cable operating structure 30 is coupled to the end of the inner wire C12 of the mechanical control cable C1. Specifically, the cable operating structure 30 includes a cable attachment part 32 to couple the brake operating member 14 to the mechanical control cable C1. The cable attachment part 32 is attached to the brake operating member 14. In this embodiment, the second pivot pin 24 is attached to the cable attachment part 32 of the cable operating structure 30. However, the second pivot pin 24 can be directly attached to the brake operating member 14 without via the cable operating structure 30.

As seen in FIGS. 4 and 5, the bicycle operating device 10 comprises an electrical switch 34 to provide an electric signal in response to a movement of the additional operating member 16. The electrical switch 34 is disposed at the brake operating member 14. In this embodiment, the electrical switch 34 is attached to the brake operating member 14 to move together with the brake operating member 14 in the first direction D1. The electrical switch 34 provides the electric signal in response to the movement of the additional operating member 16 in the second direction D2. While the electrical switch 34 is a normally open switch in this embodiment, other type of switches can be applied to the bicycle operating device 10.

While the electrical switch 34 is used as a shift control switch in this embodiment, the electrical switch 34 can be used as a switch other than the shift control switch. For example, the electrical switch 34 can be used as a suspension control switch in a case where the electrical bicycle component BC2 includes the electric suspension. The electrical switch 34 can be used as a seatpost control switch in a case where the electrical bicycle component BC2 includes the electric seatpost.

Figure 7:
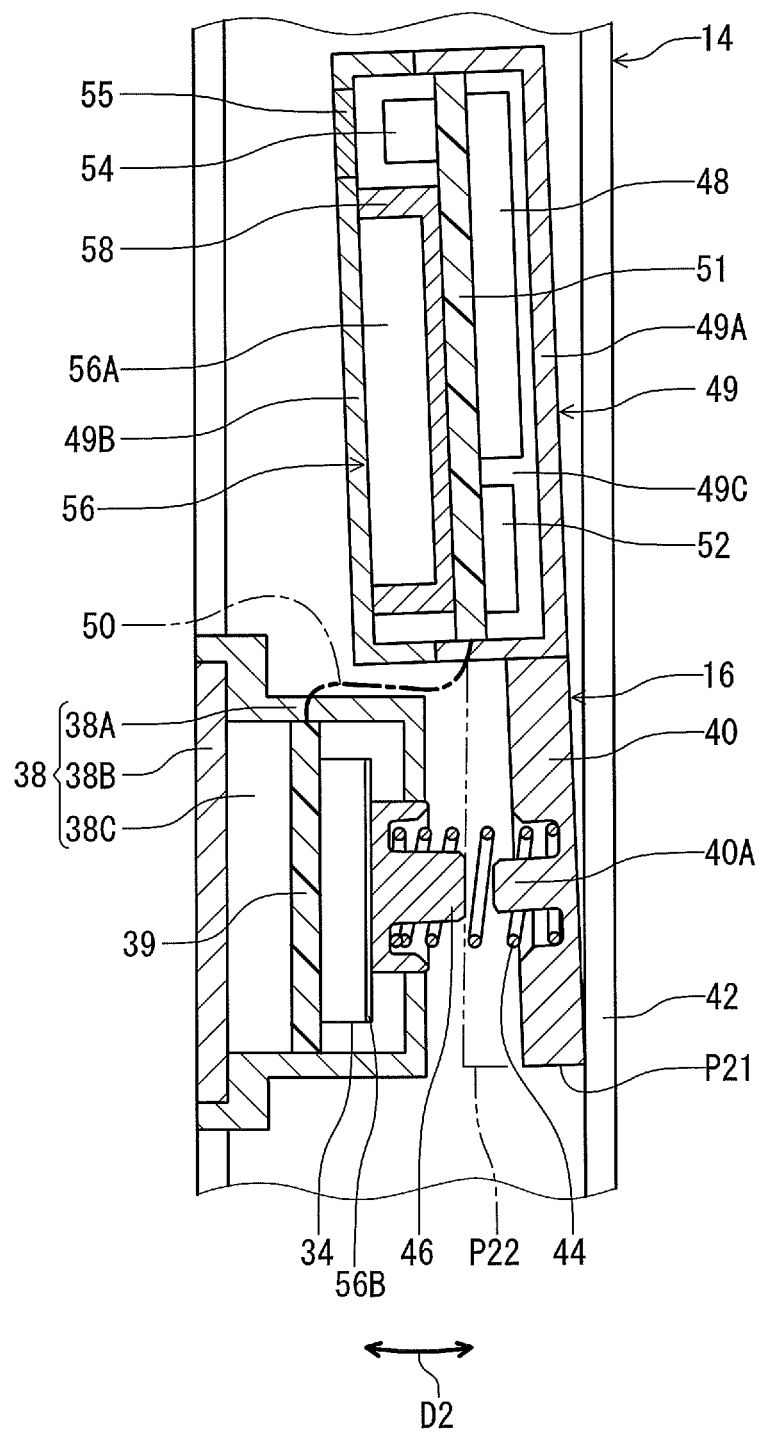
FIG. 7 is a cross-sectional view of the bicycle operating device taken along line VII-VII of FIG. 5.

As seen in FIGS. 5 and 7, the additional operating member 16 includes a lever 36. The lever 36 includes a first lever end 36A and a second lever end 36B. The first lever end 36A is pivotally coupled to the brake operating member 14 about the second pivot axis A2. The brake operating member 14 includes an attachment part 38. The electrical switch 34 is attached to the attachment part 38. The attachment part 38 includes an attachment base 38A and a cover 38B. The cover 38B is detachably attached to the attachment base 38A with fasteners such as screws. An internal space 38C is defined by the attachment base 38A and the cover 38B. The internal space 38C is sealed by seal members (not shown) in a state where the cover 38B is attached to the attachment base 38A. The electrical switch 34 is disposed in the internal space 38C of the attachment part 38. The bicycle operating device 10 comprises an electronic substrate 39. The electronic substrate 39 is secured to the brake operating member 14 (e.g., the attachment part 38). The electronic substrate 39 is disposed in the internal space 38C. The electrical switch 34 is mounted on the electronic substrate 39.

As seen in FIG. 7, the additional operating member 16 includes an actuation part 40 disposed to face the electrical switch 34 to press the electrical switch 34 in response to the movement of the additional operating member 16.

The actuation part 40 includes a projection 40A to face the electrical switch 34. The brake operating member 14 includes a receiving part 42. The receiving part 42 is spaced part from the actuation part 40 in the second direction D2. The electrical switch 34 and the attachment part 38 are disposed between the actuation part 40 and the receiving part 42 in the second direction D2. The additional operating member 16 is contactable with the receiving part 42. The additional operating member 16 is positioned at the second rest position P21 by the receiving part 42 in a state where the additional operating member 16 is in contact with the receiving part 42.

The bicycle operating device 10 comprises a second biasing member 44. The second biasing member 44 is disposed between the electrical switch 34 and the actuation part 40 to bias the additional operating member 16 toward the second rest position P21. Thus, the additional operating member 16 is positioned at the second rest position P21 by the receiving part 42 in a state where the additional operating member 16 is not operated by the user.

As seen in FIG. 7, the bicycle operating device 10 comprise a button element 46 to transmit, to the electrical switch 34, the movement of the additional operating member 16 in the second direction D2. The button element 46 is disposed on the attachment part 38 to face the actuation part 40 in the second direction D2. Specifically, the button element 46 is disposed to face the projection 40A in the second direction D2. In this embodiment, the second biasing member 44 includes a coil spring. The second biasing member 44 is held by the projection 40A and the button element 46.

The button element 46 is in contact with the projection 40A in a state where the additional operating member 16 is at the second operated position P22. This contact closes the electrical switch 34 to provide the electric signal. The electrical switch 34 is open not to provide the electric signal when the additional operating member 16 is returned to the second rest position P21.

Figure 8:
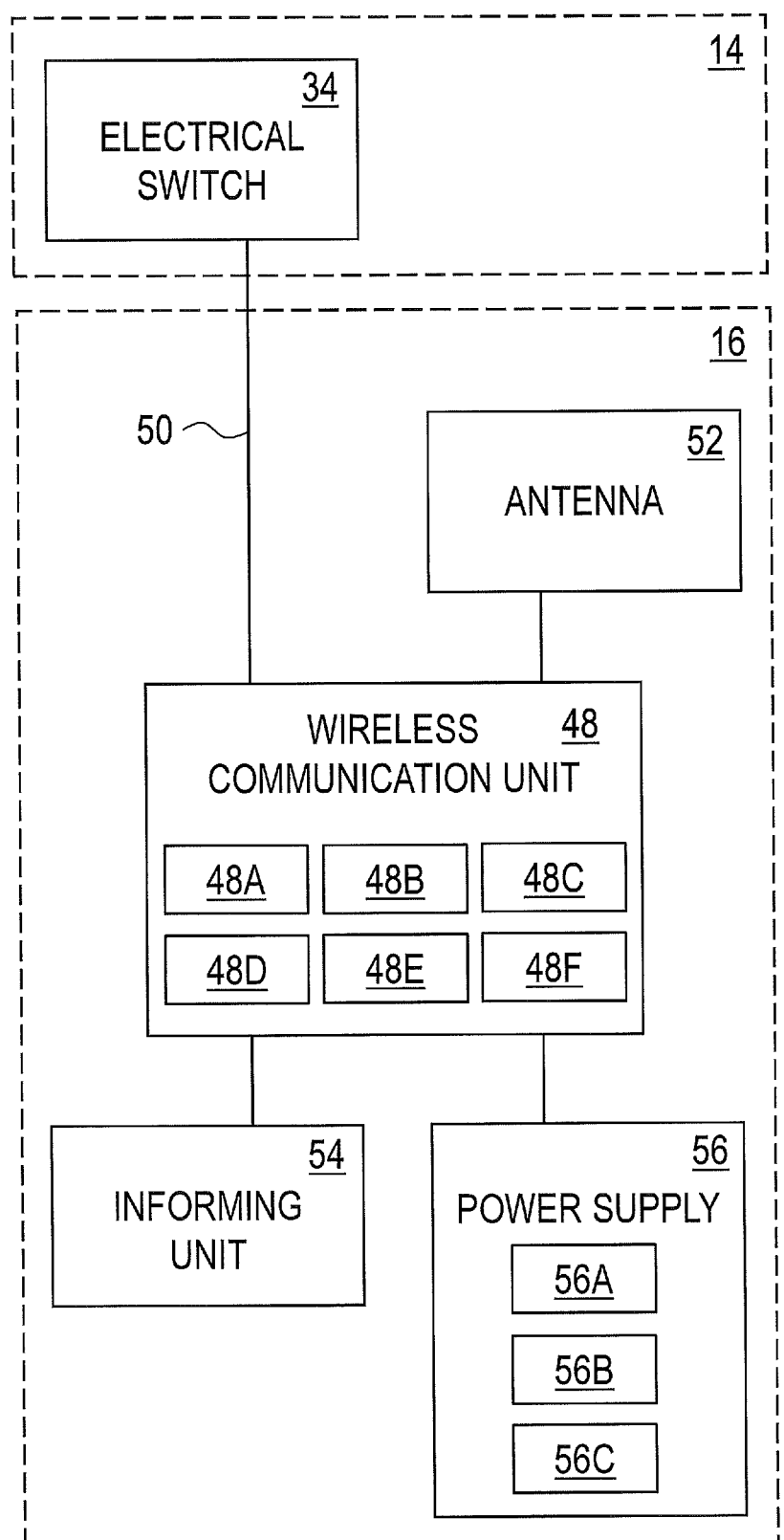
FIG. 8 is a schematic block diagram of the bicycle operating device illustrated in FIG. 1.

As seen in FIGS. 7 and 8, the bicycle operating device 10 comprises a wireless communication unit 48 connected to the electrical switch 34 to transmit a wireless signal based on the electric signal. The wireless communication unit 48 is disposed at the additional operating member 16.

As seen in FIG. 7, the wireless communication unit 48 is attached to the additional operating member 16. Specifically, the additional operating member 16 includes an additional attachment part 49. The additional attachment part 49 is disposed at the second lever end 36B of the additional operating member 16. The additional attachment part 49 includes an additional attachment base 49A and an additional cover 49B. The additional attachment base 49A is attached to the second lever end 36B. In this embodiment, the additional attachment base 49A is integrally provided with the additional operating member 16 as a one-piece unitary member. The additional cover 49B is detachably attached to the additional attachment base 49A with fasteners such as screws. An additional internal space 49C is defined by the additional attachment base 49A and the additional cover 49B. The additional internal space 49C is sealed by seal members (not shown) in a state where the additional cover 49B is attached to the additional attachment base 49A. The wireless communication unit 48 is disposed in the additional internal space 49C of the additional attachment part 49.

The bicycle operating device 10 comprises an additional electronic substrate 51. The additional electronic substrate 51 is secured to the additional attachment part 49. The additional electronic substrate 51 is disposed in the additional internal space 49C. The wireless communication unit 48 is mounted on the additional electronic substrate 51. The wireless communication unit 48 is electrically connected to the electrical switch 34 via an electrical wiring 50. Specifically, the additional electronic substrate 51 is electrically connected to the electronic substrate 39 via the electrical wiring 50. Namely, the wireless communication unit 48 is electrically connected to the electrical switch 34 via the electronic substrate 39, the additional electronic substrate 51, and the electrical wiring 50.

As seen in FIG. 8, in this embodiment, the wireless communication unit 48 includes a processor 48A, a memory 48B, a signal generating circuit 48C, a signal transmitting circuit 48D, and a signal receiving circuit 48E. Thus, the wireless communication unit 48 can also be referred to as a wireless communication circuit 48 in the present application. The processor 48A includes a central processing unit (CPU) and a memory controller. The memory 48B is connected to the processor 48A. The memory 48B includes a read only memory (ROM) and a random access memory (RAM). The ROM includes a non-transitory computer-readable storage medium. The RAM includes a transitory computer-readable storage medium. The memory 48B includes storage areas each having an address in the ROM and the RAM. The processor 48A controls the memory 48B to store data in the storage areas of the memory 48B and reads data from the storage areas of the memory 48B. The memory 48B (e.g., the ROM) stores a program. The program is read into the processor 48A, and thereby functions of the wireless communication unit 48 (e.g., at least part of functions of the signal generating circuit 48C and the signal transmitting circuit 48D).

The signal generating circuit 48C generates wireless signals based on the electric signal input from the electrical switch 34. The signal generating circuit 48C superimposes digital signals on carrier wave using a predetermined wireless communication protocol to generate the wireless signals. The signal transmitting circuit 48D transmits the wireless signal via the antenna 52 in response to the electric signal input from the electrical switch 34. In this embodiment, the signal generating circuit 48C can encrypt control information (e.g., shift information) to generate encrypted wireless signals. The signal generating circuit 48C encrypts digital signals stored in the memory 48B using a cryptographic key. The signal transmitting circuit 48D transmits the encrypted wireless signals. Thus, the wireless communication unit 48 wirelessly transmits the wireless signal to upshift or downshift the electric shifting device BC2 when the electrical switch 34 is closed to provide the electric signal.

Further, the signal receiving circuit 48E receives a wireless signal from the electric shifting device BC2 via the antenna 52. In this embodiment, the signal receiving circuit 48E decodes the wireless signal to recognize information wirelessly transmitted from the electric shifting device BC2. The signal receiving circuit 48E may decrypt the encrypted wireless signal using the cryptographic key. Namely, the wireless communication unit 48 is configured to transmit a wireless signal to control other electrical bicycle components and to receive a wireless signal to recognize information from other electrical bicycle components. In other words, the wireless communication unit 48 is provided as a wireless transmitter and a wireless receiver. The other electrical bicycle components can include the electric suspension and the electric seatpost in addition to the electric shifting device BC2. In this embodiment, the wireless communication unit 48 is integrally provided as a single module or unit. However, the wireless communication unit 48 can be constituted of a wireless transmitter and a wireless receiver which are provided as separate modules or units arranged at different positions from each other. The signal receiving circuit 48E can be omitted from the wireless communication unit 48.

As seen in FIGS. 7 and 8, the bicycle operating device 10 comprises an antenna 52 connected to the wireless communication unit 48. The antenna 52 is mounted on the additional electronic substrate 51. The wireless communication unit 48, the additional electronic substrate 51, and the antenna 52 are disposed in the additional internal space 49C of the additional attachment part 49. The wireless communication unit 48 wirelessly transmits the wireless signal based on the electric signal via the antenna 52. The antenna 52 can be included in the wireless communication unit 48 or can be integrally provided with the wireless communication unit 48 as a single module or unit.

The bicycle operating device 10 further comprises an informing unit 54. The informing unit 54 is connected to the wireless communication unit 48 to inform a user of a status of the wireless communication unit 48. The informing unit 54 is disposed on at least one of the base member 12, the brake operating member 14, and the additional operating member 16. In this embodiment, as seen in FIG. 7, the informing unit 54 is disposed on the additional operating member 16. However, the informing unit 54 can be disposed on at least one of the base member 12 and the brake operating member 14 instead of or in addition to on the additional operating member 16. Examples of the status of the wireless communication unit 48 include a signal transmission status and a power supply status.

As seen in FIG. 7, the informing unit 54 is mounted on the additional electronic substrate 51. The informing unit 54 is disposed in the additional internal space 49C of the additional attachment part 49. The informing unit 54 is electrically connected to the wireless communication unit 48 via the additional electronic substrate 51. The informing unit 54 includes a light emitting element such as a light emitting diode (LED). However, the informing unit 54 can include other elements such as a buzzer and/or an output interface to a cycle computer instead of or in addition to the light emitting element. Light from the informing unit 54 is visible from outside of the bicycle operating device 10 via a clear window 55.

As seen in FIGS. 7 and 8, the bicycle operating device 10 further comprises a power supply 56 connected to at least one of the electrical switch 34 and the wireless communication unit 48. The power supply 56 is disposed on at least one of the base member 12, the brake operating member 14, and the additional operating member 16. In this embodiment, as seen in FIG. 8, the power supply 56 is electrically connected to the wireless communication unit 48 to supply electric energy (e.g., a power source voltage) to the wireless communication unit 48. The power supply 56 supplies the electric energy to other elements via the wireless communication unit 48. However, the power supply 56 can be electrically connected to the other elements without via the wireless communication unit 48.

As seen in FIG. 7, the power supply 56 is disposed at the additional operating member 16. However, the power supply 56 can be disposed on at least one of the brake operating member 14 and the base member 12 instead of or in addition to on the additional operating member 16. The power supply 56 is mounted on the additional electronic substrate 51. The power supply 56 is disposed in the additional internal space 49C of the additional attachment part 49.

As seen in FIG. 8, in this embodiment, the power supply 56 includes a battery 56A, an electric-energy generation element 56B, and a rectifying circuit 56C. The battery 56A is held in a battery holder 58 arranged in the additional internal space 49C of the additional attachment part 49. Examples of the battery 56A include a primary battery such as a lithium manganese dioxide battery, and a secondary battery such as a lithium-ion secondary battery. In this embodiment, the battery 56A is a primary button battery. The electric-energy generation element 56B generates the electric energy using pressure and/or vibration. In this embodiment, the electric-energy generation element 56B generates electric energy (e.g., alternating current) using pressure and/or vibration caused by a movement of at least one of the brake operating member 14, the additional operating member 16, and the button element 46. Examples of the electric-energy generation element 56B includes a piezoelectric element. The electric-energy generation element 56B is attached to the electrical switch 34 and is disposed between the electrical switch 34 and the button element 46. However, the electric-energy generation element 56B can be disposed at other positions. The electric-energy generation element 56B is electrically connected to the electronic substrate 39. The electric-energy generation element 56B is electrically connected to the wireless communication unit 48 via the electronic substrate 39. The rectifying circuit 56C is electrically connected to the electric-energy generation element 56B to rectify the electric energy generated by the electric-energy generation element 56B. The rectifying circuit 56C is mounted to the electronic substrate 39 and is electrically connected to the wireless communication unit 48 and the electric-energy generation element 56B. Since the electric-energy generation element 56B and the rectifying circuit 56C have been well known in the electronics field, they will not be described and/or illustrated in detail here for the sake of brevity. The power source voltage is applied from the power supply 56 to the wireless communication unit 48.

The wireless communication unit 48 includes a voltage regulator 48F. The voltage regulator 48F regulates the power source voltage to a level at which various circuits of the wireless communication unit 48 and the informing unit 54 can properly operate. The voltage regulator 48F supplies the regulated voltage to the processor 48A, the memory 48B, the signal generating circuit 48C, the signal transmitting circuit 48D, the signal receiving circuit 48E, and the informing unit 54. The voltage regulator 48F can be provided in the power supply 56.

The voltage regulator 48F switches the power source voltage between the battery 56A and the electric-energy generation element 56B. At first, for example, the wireless communication unit 48 preferentially uses the electric energy generated by the electric-energy generation element 56B to transmit the wireless signal based on the electric signal. When the transmission of the wireless signal is completed using only the electric energy generated by the electric-energy generation element 56B, the voltage regulator 48F interrupts supply of the electric energy from the battery 56A to reduce the standby power consumption of the battery 56A. When the transmission of the wireless signal is not completed due to insufficient electric energy, the wireless communication unit 48 uses the electric energy supplied from the battery 56A to transmit the wireless signal based on the electric signal. The remaining electric energy generated by the electric-energy generation element 56B can be charged to a rechargeable battery (not shown) if necessary. In such an embodiment, the rechargeable battery is provided in the power supply 56 instead of or in addition to the battery 56A.

The bicycle operating device 10 has the following features.

(1) The bicycle operating device 10 comprises the base member 12, the brake operating member 14, the additional operating member 16, the electrical switch 34, and the wireless communication unit 48. The electrical switch 34 is disposed at the brake operating member 14. The wireless communication unit 48 is disposed at the additional operating member 16. Accordingly, it is possible to improve a design freedom of the bicycle operating device 10 compared with a case where the electrical switch 34 and the wireless communication unit 48 is disposed at one of the brake operating member 14 and the additional operating member 16.

(2) The additional operating member 16 includes the actuation part 40 disposed to face the electrical switch 34 to press the electrical switch 34 in response to the movement of the additional operating member 16. Accordingly, it is possible to easily press the electrical switch 34 using the movement of the additional operating member 16.

(3) The actuation part 40 includes the projection 40A to face the electrical switch 34. Accordingly, it is possible to transmit the movement of the additional operating member 16 to the electrical switch 34 using the projection 40A.

(4) The bicycle operating device 10 further comprises the cable operating structure 30 coupled to the brake operating member 14 to move the mechanical control cable C1 in response to a movement of the brake operating member 14 relative to the base member 12. Accordingly, it is possible to respectively operate the bicycle brake BC1 and the electrical bicycle component BC2 using the brake operating member 14 and the additional operating member 16 via the mechanical control cable C1 and a wireless communication.

(5) The bicycle operating device 10 further comprises the informing unit 54 disposed on at least one of the base member 12, the brake operating member 14, and the additional operating member 16. Accordingly, it is possible to inform a user of information relating to the bicycle operating device 10.

(6) The informing unit 54 is connected to the wireless communication unit 48 to inform a user of a status of the wireless communication unit 48. Accordingly, it is possible to check the status of the wireless communication unit 48.

(7) The base member 12 includes the first end portion 12A and the second end portion 12B opposite to the first end portion 12A. The brake operating member 14 is movably coupled to the second end portion 12B. Thus, it is possible to provide a distance between the handlebar H and the brake operating member 14. Accordingly, it is possible to easily operate the brake operating member 14.

(8) The first end portion 12A includes the mounting surface 12E having the curved shape corresponding to the drop-down handlebar H. Accordingly, it is possible to firmly fix the bicycle operating device 10 to the drop-down handlebar H.

(9) The base member 12 includes the grip portion 12C arranged between the first end portion 12A and the second end portion 12B. The grip portion 12C allows the user to easily operate at least one of the brake operating member 14 and the additional operating member 16.

(10) The second end portion 12B includes the pommel portion 12D. The pommel portion 12D allows the user to lean on the base member 12 during riding a bicycle.

(11) The brake operating member 14 is pivotable relative to the base member 12 between the first rest position P11 and the first operated position P12. The additional operating member 16 is at least partially closer to the first end portion 12A than the brake operating member 14 in the rest state where the brake operating member 14 is at the first rest position P11. Accordingly, it is possible to improve the operability of the additional operating member 16 compared with a case where the additional operating member 16 is farther from the first end portion 12A than the brake operating member 14.

(12) The brake operating member 14 is pivotally coupled to the base member 12 in the first direction D1. The additional operating member 16 is pivotally coupled to the brake operating member 14 in the second direction D2. The second direction D2 is different from the first direction D1. Accordingly, it is possible to differentiate the movement of the additional operating member 16 from the movement of the brake operating member 14. This allows the user to easily recognize each of the movement of the brake operating member 14 and the movement of the additional operating member 16 with simplifying the structure of the bicycle operating device 10.

(13) Since the second pivot axis A2 is non-parallel to the first pivot axis A1, it is possible to effectively differentiate the movement of the additional operating member 16 from the movement of the brake operating member 14. This allows the user to easily recognize each of the movement of the brake operating member 14 and the movement of the additional operating member 16 with simplifying the structure of the bicycle operating device 10.

(14) The second pivot axis A2 is disposed above the first pivot axis A1 in the mounting state where the bicycle operating device 10 is mounted to the handlebar H. Accordingly, it is possible to make a radius of the pivotal movement of the additional operating member 16 longer than a case where the second pivot axis A2 is disposed below the first pivot axis A1 in the mounting state, for example. This can reduce a change in an orientation of the additional operating member 16 relative to the brake operating member 14 when the additional operating member 16 is pivoted relative to the brake operating member 14 about the second pivot axis A2. Thus, it is possible to stabilize the movement of the additional operating member 16 relative to the brake operating member 14.

(15) The power supply 56 is connected to at least one of the electrical switch 34 and the wireless communication unit 48. Accordingly, it is possible to supply electric power to the at least one of the electrical switch 34 and the wireless communication unit 48.

(16) The power supply 56 is disposed on at least one of the base member 12, the brake operating member 14, and the additional operating member 16. Accordingly, it is possible to handle the bicycle operating device 10 including the power supply 56 as a single unit.

Second Embodiment

A bicycle operating device 210 in accordance with a second embodiment will be described below referring to FIGS. 9 to 12. The bicycle operating device 210 has the same structure and/or configuration as those of the bicycle operating device 10 except for the arrangement of some elements. Thus, elements having substantially the same function as those in the first embodiment will be numbered the same here, and will not be described and/or illustrated again in detail here for the sake of brevity.

Figure 9:
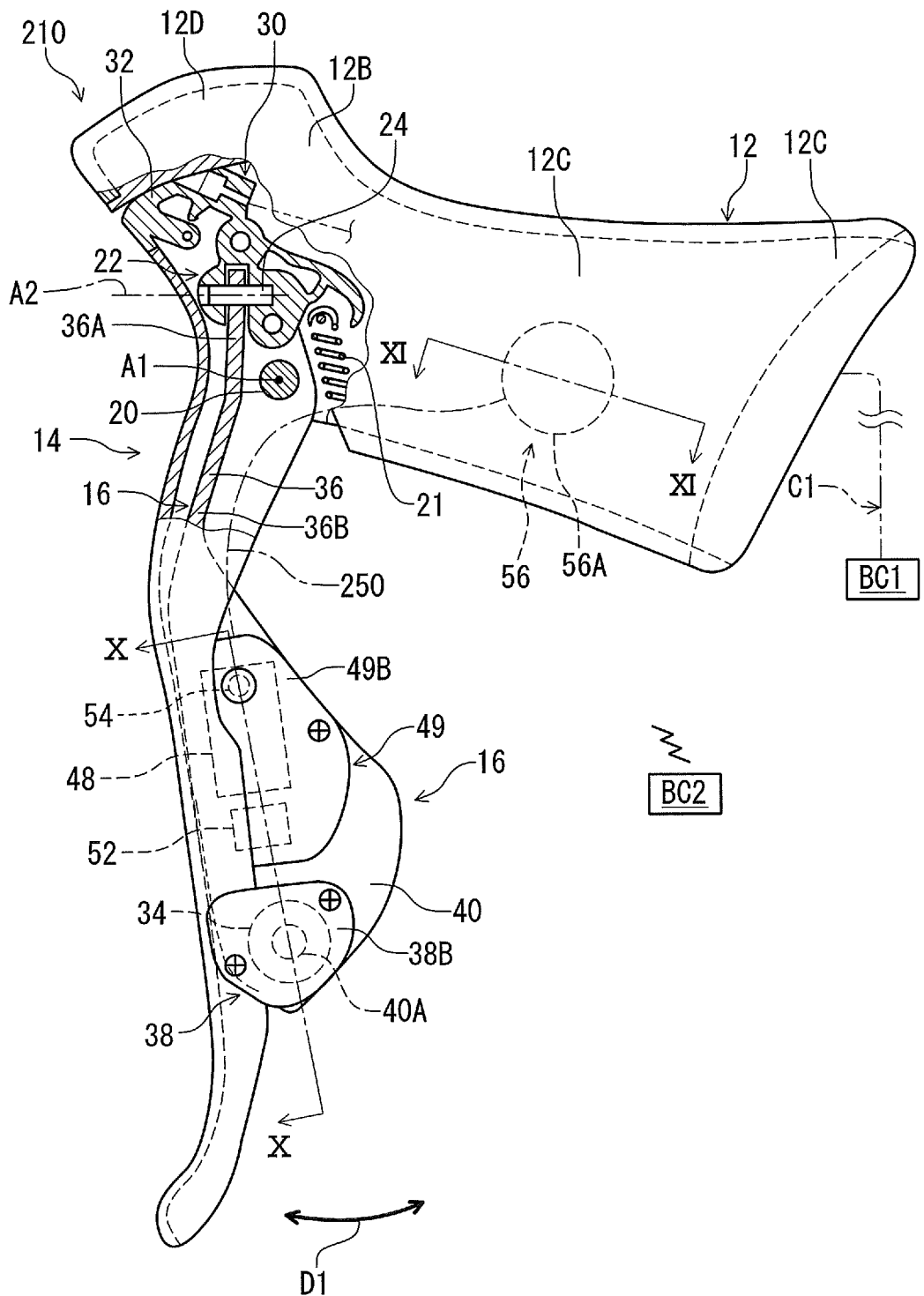
FIG. 9 is a left side elevational view of a bicycle operating device in accordance with a second embodiment.
Figure 10:
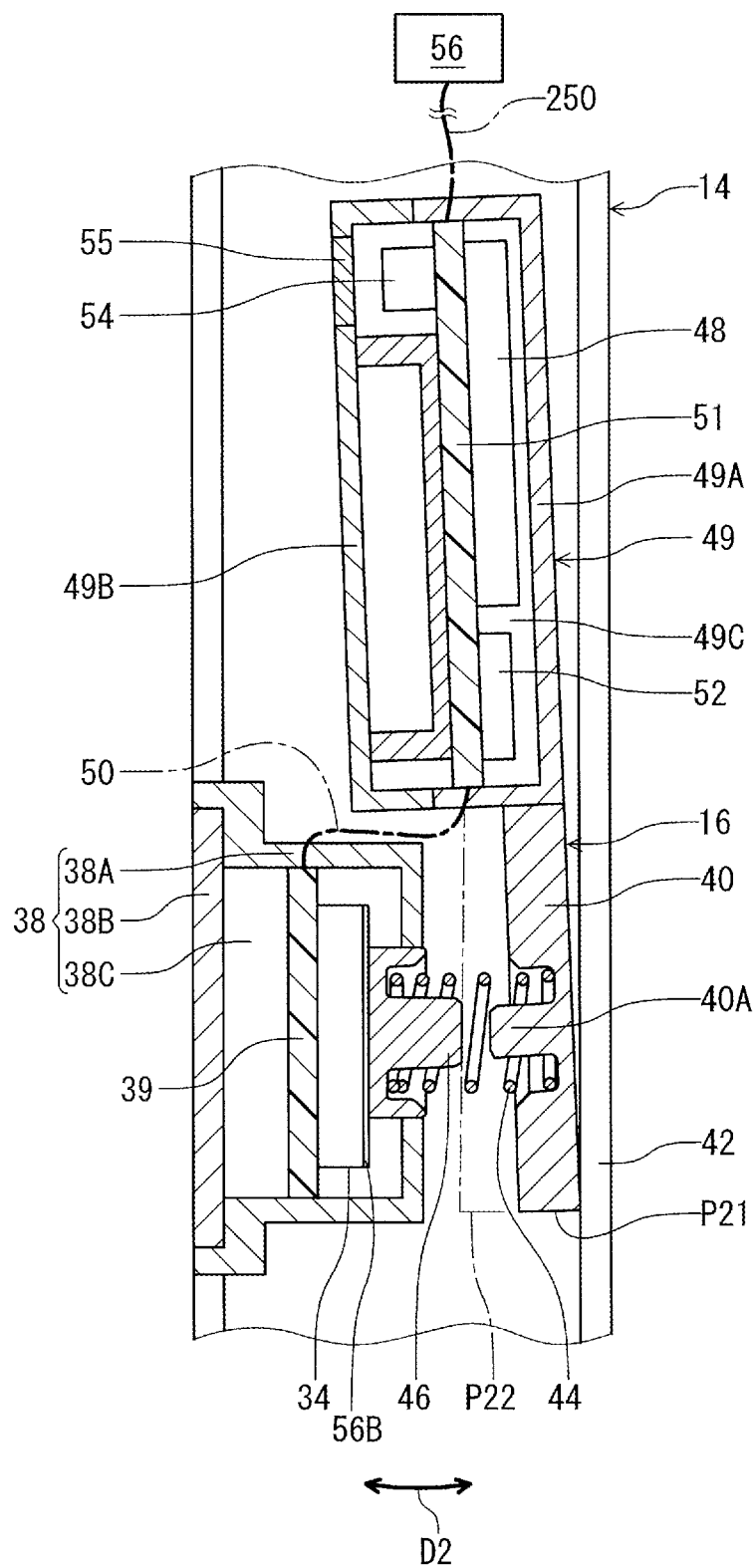
FIG. 10 is a cross-sectional view of the bicycle operating device taken along line X-X of FIG. 9.

As seen in FIGS. 9 and 10, the bicycle operating device 210 comprises the base member 12, the brake operating member 14, the additional operating member 16, the electrical switch 34, the wireless communication unit 48, the informing unit 54, and the power supply 56. The electrical switch 34 is disposed at the brake operating member 14. The wireless communication unit 48 is disposed at the additional operating member 16. The informing unit 54 is disposed at the additional operating member 16.

Figure 11:
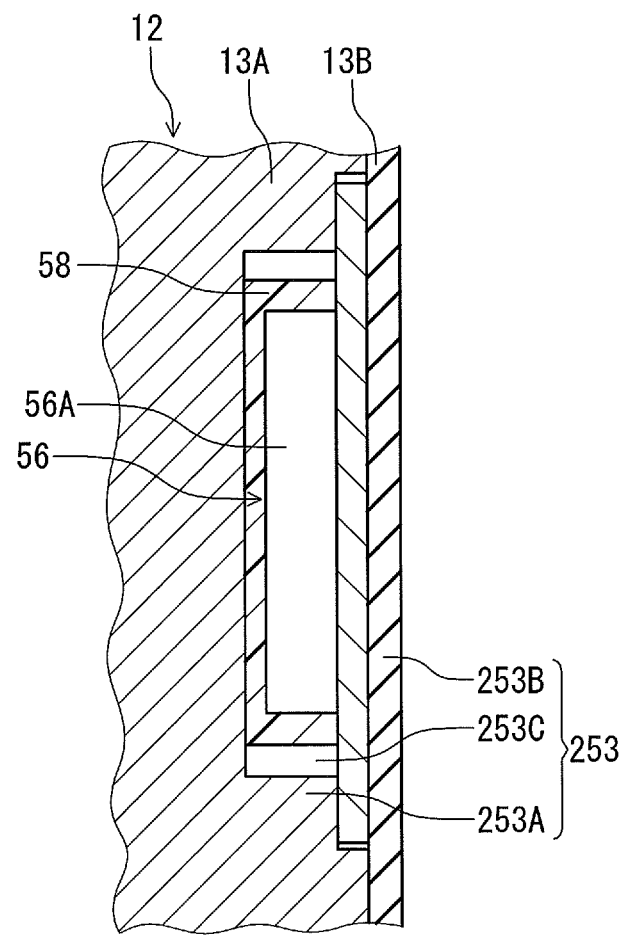
FIG. 11 is a cross-sectional view of the bicycle operating device taken along line XI-XI of FIG. 9.
Figure 12:
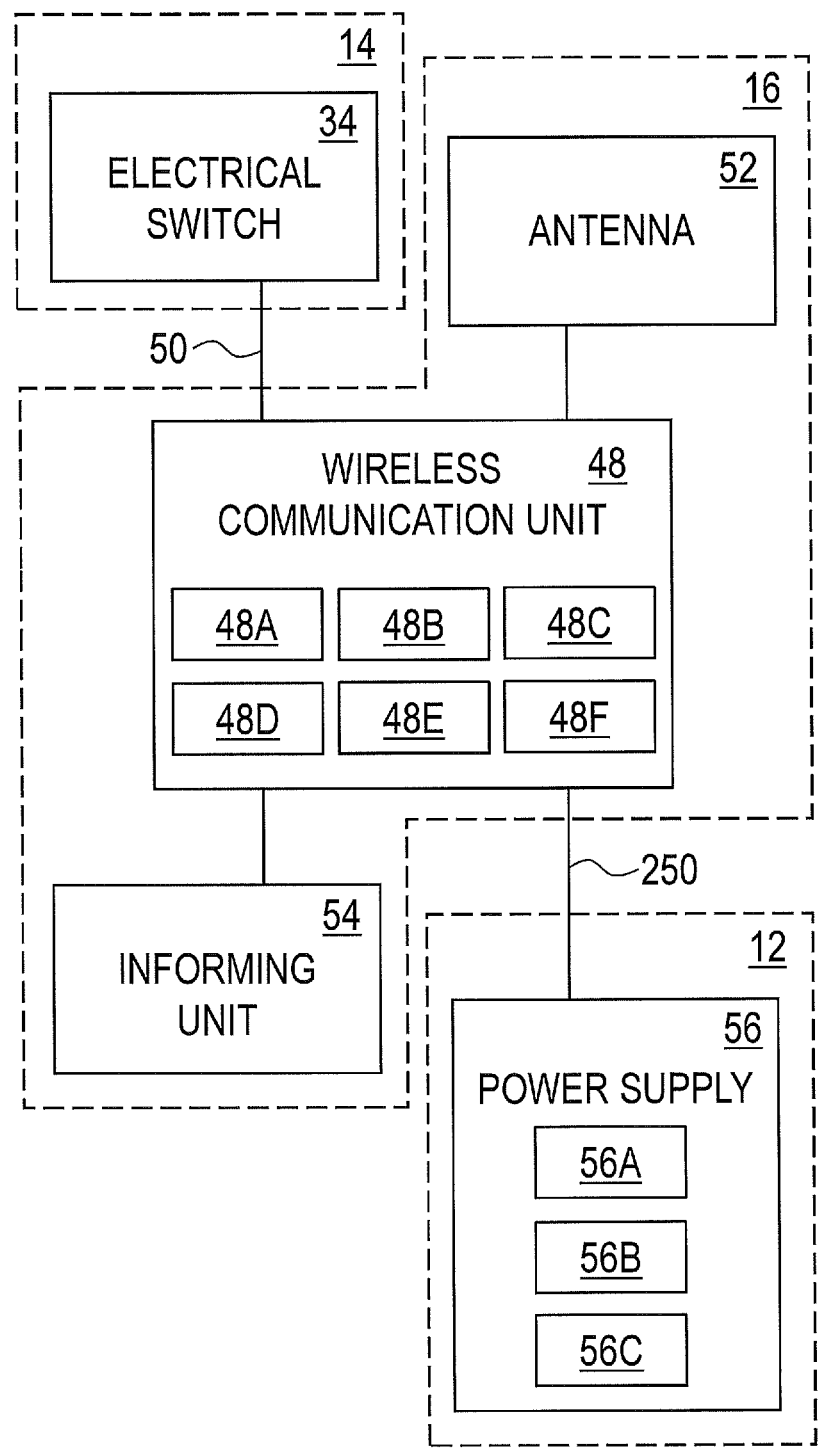
FIG. 12 is a schematic block diagram of the bicycle operating device illustrated in FIG. 9.

Unlike the bicycle operating device 10 of the first embodiment, the power supply 56 is disposed at the base member 12. As seen in FIG. 11, the bicycle operating device 210 comprises a second additional attachment part 253. The second additional attachment part 253 is disposed at the base member 12. The second additional attachment part 253 includes a second additional attachment base 253A and a second additional cover 253B. The second additional attachment base 253A is attached to the base member 12. In this embodiment, the second additional attachment base 253A is integrally provided with the base body 13A of the base member 12 as a one-piece unitary member. The second additional cover 253B is detachably attached to the second additional attachment base 253A with fasteners such as screws. A second additional internal space 253C is defined by the second additional attachment base 253A and the second additional cover 253B. The second additional internal space 253C is sealed by seal members (not shown) in a state where the second additional cover 253B is attached to the second additional attachment base 253A. The power supply 56 is disposed in the second additional internal space 253C of the second additional attachment part 253. The battery holder 58 is attached to the second additional attachment base 253A. As seen in FIG. 10, the power supply 56 is electrically connected to the additional electronic substrate 51 via an additional electrical wiring 250. Thus, the power supply 56 is electrically connected to the wireless communication unit 48 via the additional electrical wiring 250 and the additional electronic substrate 51.

With the bicycle operating device 210, it is possible to obtain substantially the same effects as those of the bicycle operating device 10 of the first embodiment.

Furthermore, since the power supply 56 is disposed at the base member 12, it is possible to handle the bicycle operating device 210 including the power supply 56 as a single unit.

Third Embodiment

A bicycle operating device 310 in accordance with a third embodiment will be described below referring to FIG. 13.

The bicycle operating device 310 has the same structure and/or configuration as those of the bicycle operating device 10 except for the arrangement of some elements. Thus, elements having substantially the same function as those in the above embodiment will be numbered the same here, and will not be described and/or illustrated again in detail here for the sake of brevity.

Figure 13:
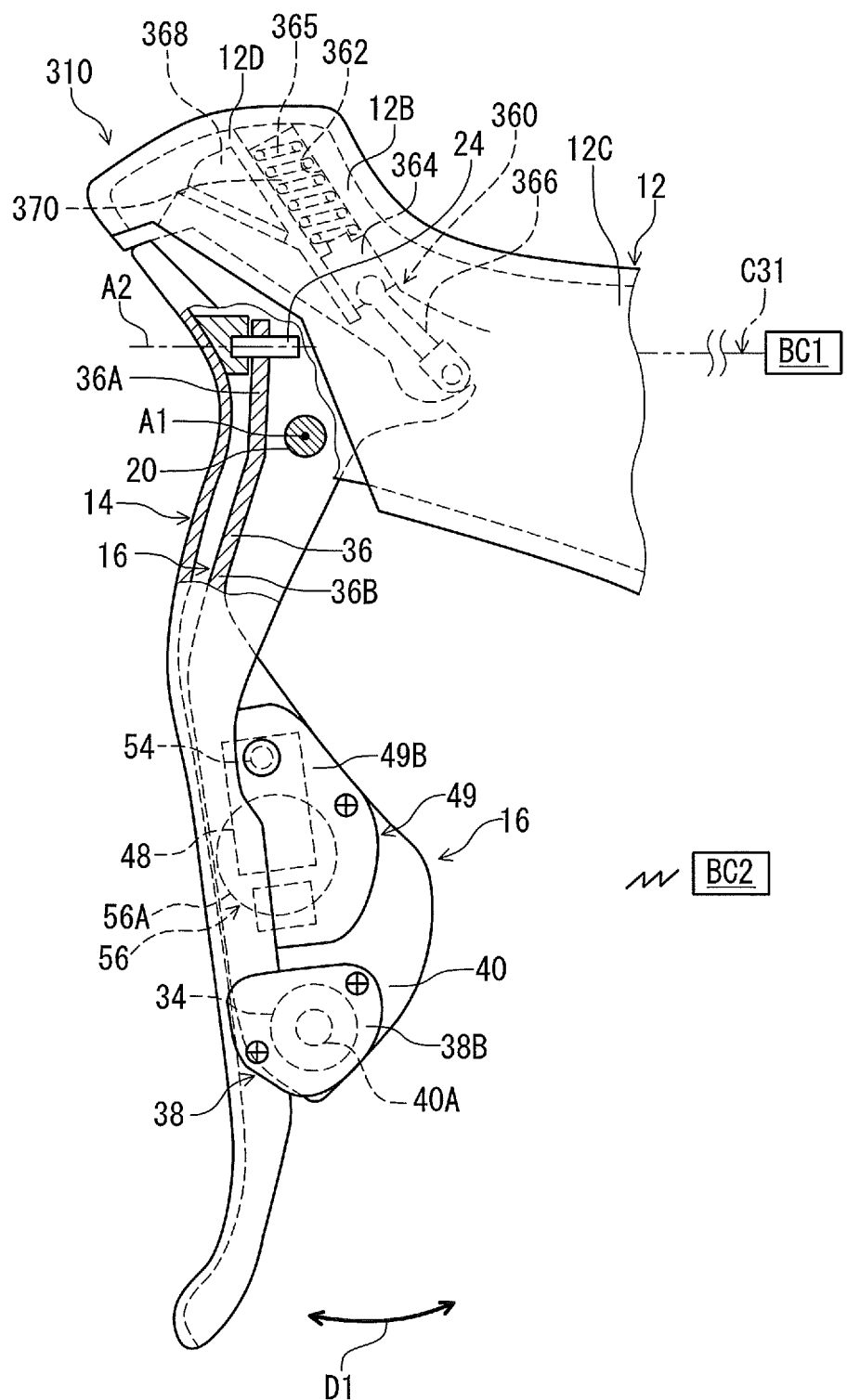
FIG. 13 is a partial left side elevational view of a bicycle operating device in accordance with a third embodiment.

As seen in FIG. 13, the bicycle operating device 310 comprises the base member 12, the brake operating member 14, the additional operating member 16, the electrical switch 34, the wireless communication unit 48, the informing unit 54, and the power supply 56. Similarly to the bicycle operating device 10 of the first embodiment, The electrical switch 34 is disposed at the brake operating member 14. The wireless communication unit 48 is disposed at the additional operating member 16. Each of the informing unit 54 and the power supply 56 is disposed on the additional operating member 16.

Unlike the bicycle operating device 10 of the first embodiment, the bicycle operating device 310 further comprise a hydraulic unit 360 instead of the cable operating structure 30. The hydraulic unit 360 is coupled to the brake operating member 14 to generate a hydraulic pressure in response to a movement of the brake operating member 14 in the first direction D1. Specifically, the hydraulic unit 360 includes a hydraulic cylinder 362, a piston 364, a return spring 365, a piston rod 366, and a hydraulic reservoir 368. The piston 364 is movably disposed in the hydraulic cylinder 362. The hydraulic cylinder 362 and the piston 364 define a hydraulic chamber 370. The return spring 365 is provided in the hydraulic chamber 370 to bias the piston 364 toward an initial position. The brake operating member 14 is coupled to the piston 364 via the piston rod 366. The hydraulic reservoir 368 is connected to the hydraulic chamber 370. The hydraulic chamber 370 is connected to the bicycle brake BC1 via a hydraulic hose C31. In this embodiment, the bicycle brake BC1 include a hydraulic brake.

With the bicycle operating device 310, it is possible to obtain substantially the same effects as those of the bicycle operating device 10 of the first embodiment.

Furthermore, the bicycle operating device 310 further comprises the hydraulic unit 360 coupled to the brake operating member 14 to generate a hydraulic pressure in response to the movement of the brake operating member 14 relative to the base member 12. Accordingly, it is possible to respectively operate the bicycle brake BC1 and the electrical bicycle component BC2 using the brake operating member 14 and the additional operating member 16 via a hydraulic fluid and a wireless communication.

Fourth Embodiment

A bicycle operating device 410 in accordance with a fourth embodiment will be described below referring to FIGS. 14 and 15. The bicycle operating device 410 has the same structure and/or configuration as those of the bicycle operating device 310 except for the base member 12. Thus, elements having substantially the same function as those in the above embodiment will be numbered the same here, and will not be described and/or illustrated again in detail here for the sake of brevity.

Figure 14:
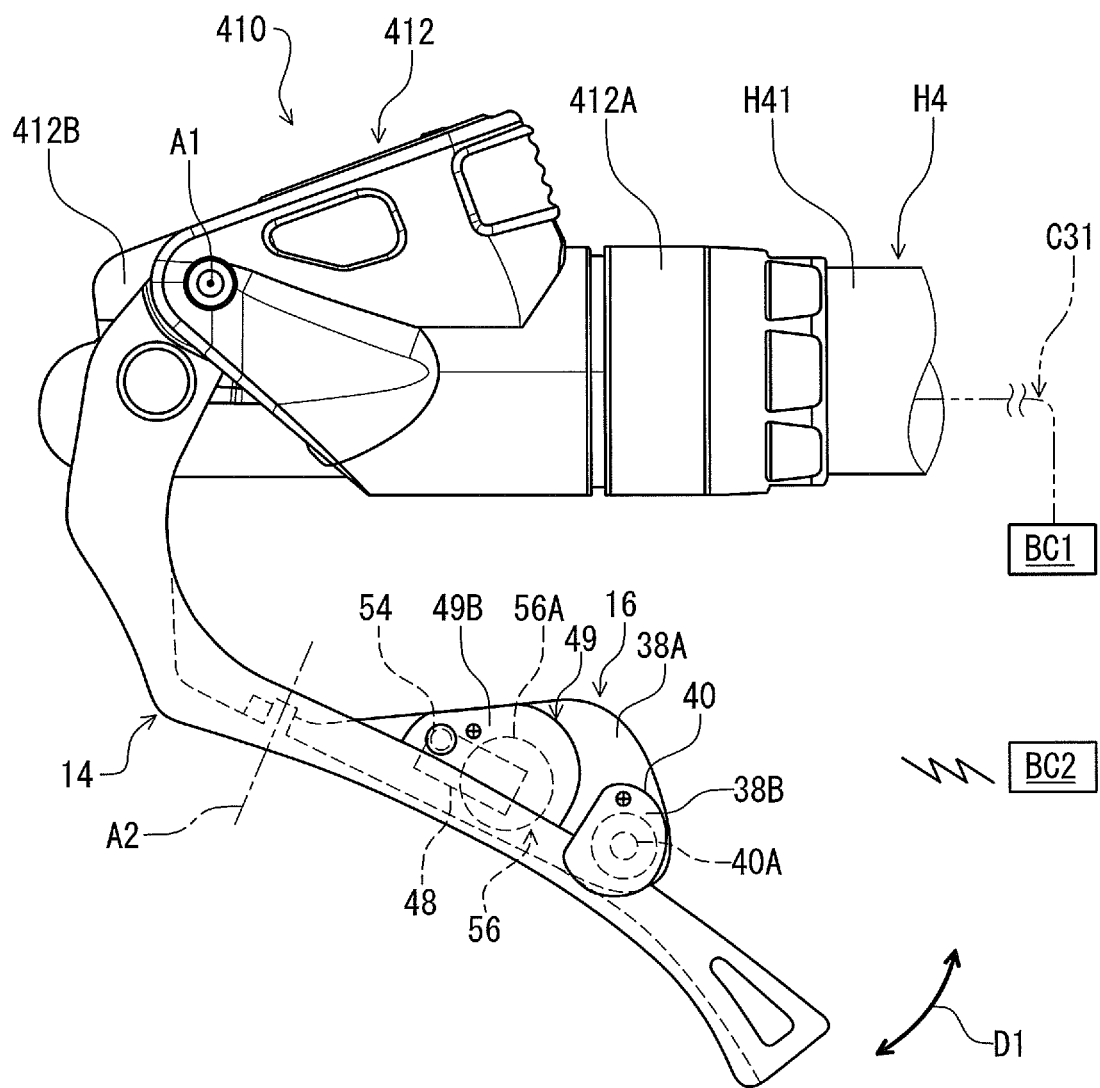
FIG. 14 is a left side elevational view of a bicycle operating device in accordance with a fourth embodiment.

As seen in FIG. 14, the bicycle operating device 410 comprises a base member 412, the brake operating member 14, the additional operating member 16, the electrical switch 34, the wireless communication unit 48, the informing unit 54, and the power supply 56. The base member 412 has substantially the same structure as that of the base member 12 of the first or third embodiment. However, the bicycle operating device 410 is configured to be mounted to a bull horn handlebar H4 provided as the handlebar H. The bull horn handlebar H4 can also be referred to as the handlebar H4.

The base member 412 includes a first end portion 412A and a second end portion 412B. The first end portion 412A is configured to be coupled to the handlebar H4 in a mounting state where the bicycle operating device 410 is mounted to the handlebar H4. The second end portion 412B is opposite to the first end portion 412A. The brake operating member 14 is movably coupled to the second end portion 412B. However, the first end portion 412A is configured to be coupled to a bar end H41 of the handlebar H4 in the mounting state.

Figure 15:
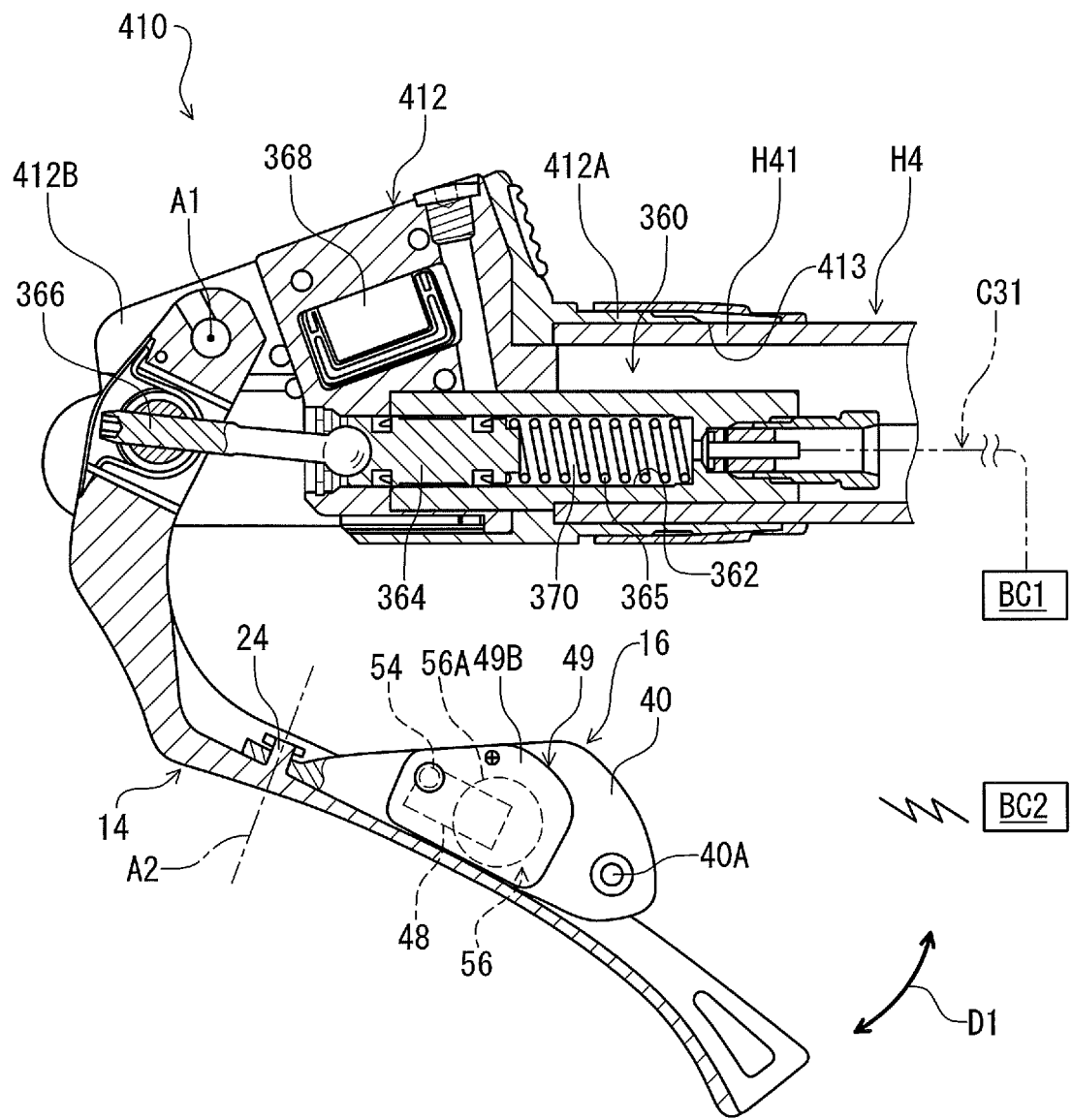
FIG. 15 is a cross-sectional view of the bicycle operating device illustrated in FIG. 14.

As seen in FIG. 15, the base member 412 includes a mounting hole 413 disposed at the first end portion 412A. The bar end H41 of the handlebar H4 is disposed in the mounting hole 413. The hydraulic unit 360 is at least partly disposed in the bar end H41 of the handlebar H4. The cable operating structure 30 of the bicycle operating device 10 can be applied to the bicycle operating device 410 instead of the hydraulic unit 360.

With the bicycle operating device 410, it is possible to obtain substantially the same effects as those of the bicycle operating device 310 of the third embodiment.

Furthermore, the first end portion 412A is configured to be coupled to the bar end H41 of the handlebar H4 in the mounting state. Accordingly, it is possible to utilize the bicycle operating device 410 as a bar-end operating device.

Modifications

Other arrangements of the informing unit 54 and the power supply 56 can be combined with the arrangements of the wireless communication unit 48 described in the above embodiments.

Figure 16:
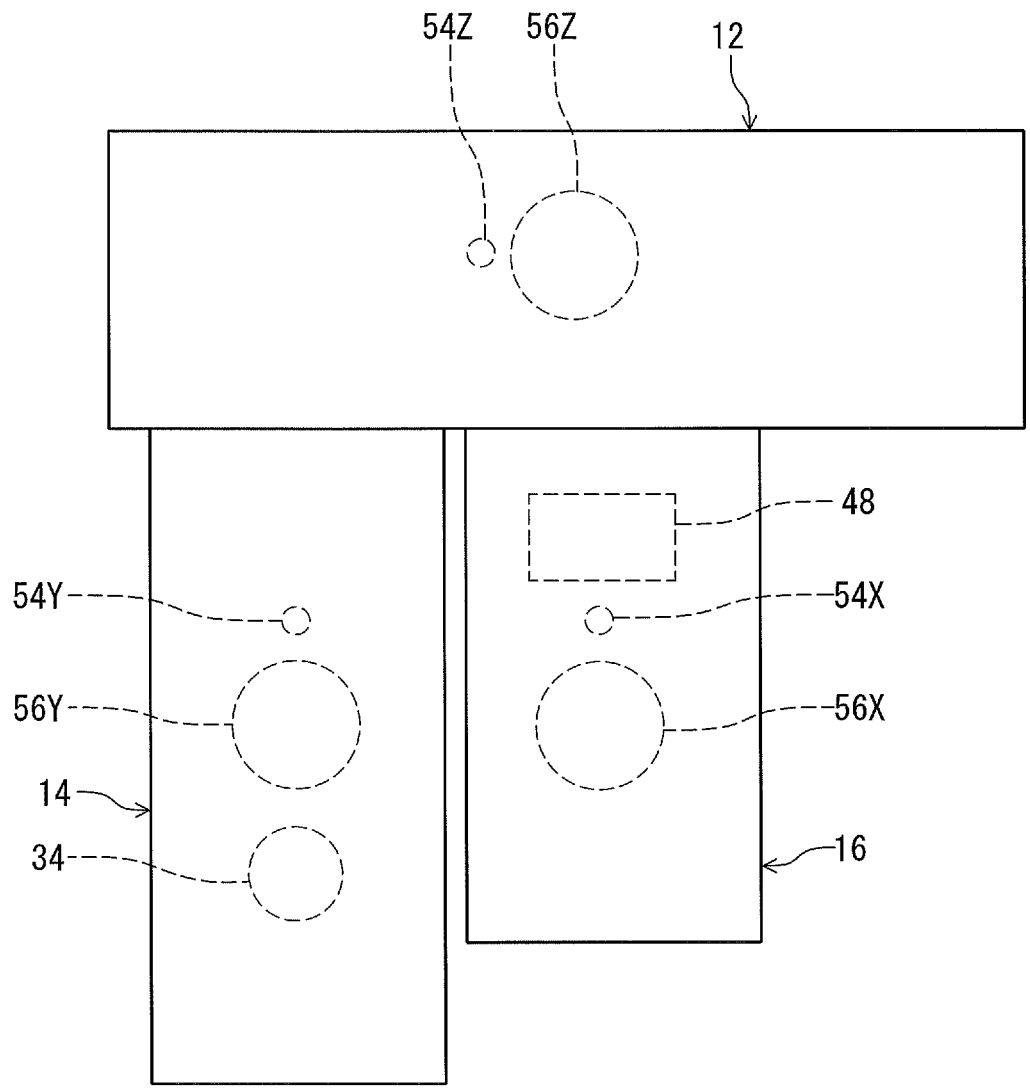
FIG. 16 is a schematic diagram showing arrangements of elements of the bicycle operating device.

FIG. 16 shows arrangements of the informing unit 54 and the power supply 56. FIGS. 17 and 18 shows combinations of the arrangements of the informing unit 54 and the power supply 56.

In FIG. 16, the informing unit 54X indicates that the informing unit 54 is disposed at the additional operating member 16. The informing unit 54Y indicates that the informing unit 54 is disposed at the brake operating member 14. The informing unit 54Z indicates that the informing unit 54 is disposed at the base member 12. The power supply 56X indicates that the power supply 56 is disposed at the additional operating member 16. The power supply 56Y indicates that the power supply 56 is disposed at the brake operating member 14. The power supply 56Z indicates that the power supply 56 is disposed at the base member 12.

In FIGS. 17 and 18, each circle indicates the arrangement of each element. As seen in FIG. 17, the combination of the informing unit 54X and the power supply 56X corresponds to each of the first, third, and fourth embodiments. The combination of the informing unit 54X and the power supply 56Z corresponds to the second embodiment.

As seen in FIGS. 17 and 18, the informing unit 54 can be disposed at one of the base member 12, the brake operating member 14, and the additional operating member 16. The informing unit 54 can be disposed at both the brake operating member 14 and the additional operating member 16. The informing unit 54 can be disposed at both the base member 12 and the additional operating member 16. The informing unit 54 can be disposed at both the base member 12 and the brake operating member 14. Furthermore, the informing unit 54 can be disposed at all of the base member 12, the brake operating member 14, and the additional operating member 16. The same can be applied to the arrangement of the power supply 56. Each of modifications M1-1 to M1-47 can be applied to the bicycle operating device of the present application.

It will be apparent to those skilled in the bicycle field from the present disclosure that the above embodiments can be at least partly combined with each other.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle operating device comprising:
  a base member;
  a brake operating member movably coupled to the base member;
  an additional operating member movably coupled to the brake operating member;
  an electrical switch to provide an electric signal in response to a movement of the additional operating member, the electrical switch being disposed at the brake operating member; and
  a wireless communication unit connected to the electrical switch to transmit a wireless signal based on the electric signal, the wireless communication unit being disposed at the additional operating member, wherein
  the brake operating member includes an attachment part provided on a rear side of the brake operating member, the attachment part having an attachment base and a cover, the attachment base having an opening on a lateral side of the brake operating member, the cover covering the opening, the attachment base and the cover defining an internal space within which the electrical switch is provided.

2. The bicycle operating device according to claim 1, wherein
the brake operating member is movably coupled to the base member about a first pivot axis,
the additional operating member is movably coupled to the brake operating member about a second pivot axis, the second pivot axis being above the first pivot axis in a mounting state where the bicycle operating device is mounted to a handlebar, the additional operating member including a first lever end and a second lever end,
the wireless communication unit is electrically coupled to the electrical switch via electrical wiring to transmit the wireless signal based on the electric signal, the wireless communication unit being disposed at the second lever end of the additional operating member, and the electrical wiring being configured to allow relative movement between the wireless communication unit and the electrical switch, and
the first lever end extending from the second pivot axis to the second lever end such that the first lever end is entirely offset from the first pivot axis when viewed in a vertical direction in the mounting state.

3. The bicycle operating device according to claim 2, wherein
the additional operating member includes an actuation part disposed to face the electrical switch to press the electrical switch in response to the movement of the additional operating member.

4. The bicycle operating device according to claim 3, wherein
the actuation part includes a projection to face the electrical switch.

5. The bicycle operating device according to claim 2, further comprising:
a cable operating structure coupled to the brake operating member to move a mechanical control cable in response to a movement of the brake operating member relative to the base member.

6. The bicycle operating device according to claim 2, further comprising:
a hydraulic unit coupled to the brake operating member to generate a hydraulic pressure in response to a movement of the brake operating member relative to the base member.

7. The bicycle operating device according to claim 2, further comprising:
an informing unit disposed on at least one of the base member, the brake operating member, and the additional operating member.

8. The bicycle operating device according to claim 7, wherein
the informing unit is connected to the wireless communication unit to inform a user of a status of the wireless communication unit.

9. The bicycle operating device according to claim 2, wherein
the base member includes
a first end portion configured to be coupled to the handlebar in the mounting state where the bicycle operating device is mounted to the handlebar, and
a second end portion opposite to the first end portion, and
the brake operating member is movably coupled to the second end portion.

10. The bicycle operating device according to claim 9, wherein
the first end portion includes a mounting surface having a curved shape corresponding to a drop-down handlebar.

11. The bicycle operating device according to claim 9, wherein
the base member includes a grip portion arranged between the first end portion and the second end portion.

12. The bicycle operating device according to claim 9, wherein
the second end portion includes a pommel portion.

13. The bicycle operating device according to claim 9, wherein
the first end portion is configured to be coupled to a bar end of the handlebar in the mounting state.

14. The bicycle operating device according to claim 9, wherein
the brake operating member is pivotable relative to the base member between a first rest position and a first operated position, and
the additional operating member is at least partially closer to the first end portion than the brake operating member in a rest state where the brake operating member is at the first rest position.

15. The bicycle operating device according to claim 2, wherein
the brake operating member is pivotally coupled to the base member in a first direction,
the additional operating member is pivotally coupled to the brake operating member in a second direction,
the second direction is different from the first direction, and
the electrical switch is configured to provide an electric signal in response to a movement of the additional operating member in the second direction.

16. The bicycle operating device according to claim 15, wherein
the brake operating member is pivotable relative to the base member about the first pivot axis in the first direction,
the additional operating member is pivotable relative to the brake operating member about the second pivot axis in the second direction, and
the second pivot axis is non-parallel to the first pivot axis.

17. The bicycle operating device according to claim 15, wherein
the brake operating member is pivotable relative to the base member about the first pivot axis in the first direction, and
the additional operating member is pivotable relative to the brake operating member about the second pivot axis in the second direction.

18. The bicycle operating device according to claim 2, further comprising:
a power supply connected to at least one of the electrical switch and the wireless communication unit.

19. The bicycle operating device according to claim 18, wherein
the power supply is disposed on at least one of the base member, the brake operating member, and the additional operating member.

20. The bicycle operating device according to claim 19, wherein
the power supply is disposed at the base member.

* * * * *